United States Patent
Zhang et al.

(10) Patent No.: US 12,477,119 B2
(45) Date of Patent: Nov. 18, 2025

(54) VECTOR DIFFERENCE CANDIDATE LIST CONSTRUCTION

(71) Applicant: QUALCOMM Incorporated, San Diego, CA (US)

(72) Inventors: Zhi Zhang, Munich (DE); Pavel Nikitin, Munich (DE); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/540,046

(22) Filed: Dec. 14, 2023

(65) Prior Publication Data

US 2024/0223769 A1 Jul. 4, 2024

Related U.S. Application Data

(60) Provisional application No. 63/480,280, filed on Jan. 17, 2023, provisional application No. 63/478,323, filed on Jan. 3, 2023.

(51) Int. Cl.
*H04N 19/137* (2014.01)
*H04N 19/105* (2014.01)
*H04N 19/176* (2014.01)

(52) U.S. Cl.
CPC ......... *H04N 19/137* (2014.11); *H04N 19/105* (2014.11); *H04N 19/176* (2014.11)

(58) Field of Classification Search
None
See application file for complete search history.

(56) References Cited

U.S. PATENT DOCUMENTS

| 2021/0006824 A1 | 1/2021 | Jeong et al. |
| 2024/0031600 A1* | 1/2024 | Li ........................ H04N 19/109 |
| 2024/0275941 A1* | 8/2024 | Zhang .................. H04N 19/11 |

OTHER PUBLICATIONS

Coban M., et al., "Algorithm Description of Enhanced Compression Model 9 (ECM 9)", JVET-AD2025, Joint Video Experts Team (JVET) of ITU-T SG 16 WP 3 and ISO/IEC JTC 1/SC 29 30th Meeting, Antalya, TR, Apr. 21-28, 2023, pp. 1-76.

(Continued)

*Primary Examiner* — Christopher G Findley
(74) *Attorney, Agent, or Firm* — Shumaker & Sieffert, P.A.

(57) ABSTRACT

A method of decoding video data includes determining a vector predictor for a current block; determining a first set of vector difference candidates based on a first pel-interval, the first pel-interval defining a first distance between consecutive vector difference candidates in the first set of vector difference candidates starting with the vector predictor; determining a second set of vector difference candidates based on the first set of vector difference candidates and a second pel-interval, the second pel-interval defining a second distance between consecutive vector difference candidates in the second set of vector difference candidates; constructing a vector difference candidate list based on the second set of vector difference candidates; determining a vector for the current block based on the vector predictor and a vector difference from the vector difference candidate list; and reconstructing the current block based on the vector for the current block.

20 Claims, 21 Drawing Sheets

(56) References Cited

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v3, Joint Video Experts Team (JVET) of ITU-T SG 16 WP 3 and ISO/IEC JTC 1/SC 29, 30th Meeting, Antalya, TR, Apr. 21-28, 2023, pp. 1-12.

Kidani Y., et al., "EE2-2.2/EE2-2.3/EE2-2.4: Bi-Predictive IBC GPM, IBC BVP-Merge, Bi-Predictive IBC Merge, and IBC MBVD list Derivation for Camera Captured and Screen Contents", JVET-AE0169-v4, Joint Video Experts Team (JVET) of ITU-T SG 16 WP 3 and ISO/IEC JTC 1/SC 29 31st Meeting, Geneva, CH, Jul. 11-19, 2023, pp. 1-4.

Kidani Y., et al., "Non-EE2: Bi-Predictive IBC for Natural and Screen Content", JVET-AD0134-v3, Joint Video Experts Team (JVET) of ITU-T SG 16 WP 3 and ISO/IEC JTC 1/SC 29 30th Meeting, Antalya, TR, Apr. 21-28, 2023, pp. 1-5.

Ma C., et al., "Non-EE2: Extension of IBC-GPM", JVET-AD0215-v2, Joint Video Experts Team (JVET) of ITU-T SG 16 WP 3 and ISO/IEC JTC 1/SC 29 30th Meeting, Antalya, TR, Apr. 21-28, 2023, pp. 1-3.

Seregin V., et al., "Exploration Experiment on Enhanced Compression beyond VVC capability (EE2)", JVET-AD2024-v2, Joint Video Experts Team (JVET) of ITU-T SG 16 WP 3 and ISO/IEC JTC 1/SC 29 30th Meeting, Antalya, TR, Apr. 21-28, 2023, pp. 1-15.

Zhang Z., et al., "EE2-related: IBC MBVD for Coding of Camera Captured Content", JVET-AD0396-v1, Joint Video Experts Team (JVET) of ITU-T SG 16 WP 3 and ISO/IEC JTC 1/SC 29, 30th Meeting, Antalya, TR, Apr. 21-28, 2023, pp. 1-2.

Coban M., et al., "Algorithm Description of Enhanced Compression Model 7 (ECM 7)", JVET-AB2025, m61505, Joint Video Experts Team (JVET) of ITU-T SG 16 WP 3 and ISO/IEC JTC 1/SC 29, 28th Meeting, Mainz, DE, Oct. 20, 2022-Oct. 28, 2022, 62 Pages, Dec. 22, 2022, XP030306363, p. 42, paragraph 3.2.31.

International Search Report and Written Opinion—PCT/US2023/084380—ISA/EPO—Mar. 15, 2024 13 pp.

Zhang Z (Qualcomm Incorporated)., et al., "Non-EE2: IBC MBVD List Derivation", Joint Video Experts Team (JVET) of ITU-T SG 16 WP 3 and ISO/IEC JTC 1/SC 29, JVET-AC0159-v2, 29th Meeting, by Teleconference, Jan. 11, 2023-Jan. 20, 2023, No. JVET-AC0159, m61741, Jan. 15, 2023, 3 Pages, XP030306778.

\* cited by examiner

VECTOR DIFFERENCE CANDIDATE LIST CONSTRUCTION

This application claims the benefit of U.S. Provisional Application No. 63/478,323 filed Jan. 3, 2023, and U.S. Provisional Application No. 63/480,280 filed Jan. 17, 2023, the entire contents of each of which are incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for constructing a vector difference candidate list (e.g., block vector difference (BVD) candidate list or motion vector difference (MVD) candidate list). As described in more detail, a video coder (e.g., video encoder or video decoder) may determine a set of vector difference candidates from which the video coder may construct the vector difference candidate list. For example, the video coder may use template matching, or some other metric, to reorder the set of vector difference candidates to construct the vector difference candidate list.

Coding gains may be realized with an increase in the granularity of distance between vector difference candidates and/or an increase in the number of directions relative to a vector predictor that are evaluated. However, an increase in granularity and directions may result in additional vector difference candidates, which in turn increases the number of calculations for template matching or other such calculations when constructing the vector difference candidate list.

This disclosure describes example techniques of constructing the vector difference candidate list in ways that allow for an increase in the number of vector difference candidates, while reducing coding delays from increased calculations. For instance, the example techniques describe ways for dynamically determining which candidates are evaluated for inclusion in the vector difference candidate list so that there is a higher likelihood that more desirable candidates are included in the vector difference candidate list, while minimizing processing time inefficiencies. In this manner, the example techniques provide a practical application for constructing a vector difference candidate list in a manner that improves the overall operation of video coding techniques.

In one example, the disclosure describes a method of decoding video data, the method comprising: determining a vector predictor for a current block of the video data; determining a first set of vector difference candidates based on a first pel-interval, the first pel-interval defining a first distance between consecutive vector difference candidates in the first set of vector difference candidates starting with the vector predictor; determining a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; constructing a vector difference candidate list based on the second set of vector difference candidates; determining a vector for the current block based on the vector predictor and a vector difference from the vector difference candidate list; and reconstructing the current block based on the vector for the current block.

In one example, the disclosure describes a device for decoding video data, the device comprising: one or more memories configured to store the video data; and processing circuitry coupled to the one or more memories, the processing circuitry being configured to: determine a vector predictor for a current block; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; determine a vector for the current block based on the vector predictor and a vector difference from the vector difference candidate list; and reconstruct the current block based on the vector for the current block.

In one example, the disclosure describes a computer-readable storage medium storing instructions thereon that when executed cause one or more processors to: determine a vector predictor for a current block of video data; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; determine a vector for the current block based on the vector predictor and a vector difference from the vector difference candidate list; and reconstruct the current block based on the vector for the current block.

In one example, the disclosure describes a device for encoding video data, the device comprising: one or more memories configured to store the video data; and processing circuitry coupled to the one or more memories, the processing circuitry being configured to: determine a vector predictor for a current block of the video data; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; and signal an index into the vector difference candidate list for decoding the current block.

The details of one or more examples are set forth in the accompanying drawings and the description below. Other features, objects, and advantages will be apparent from the description, drawings, and claims.

DETAILED DESCRIPTION

Figure 1:
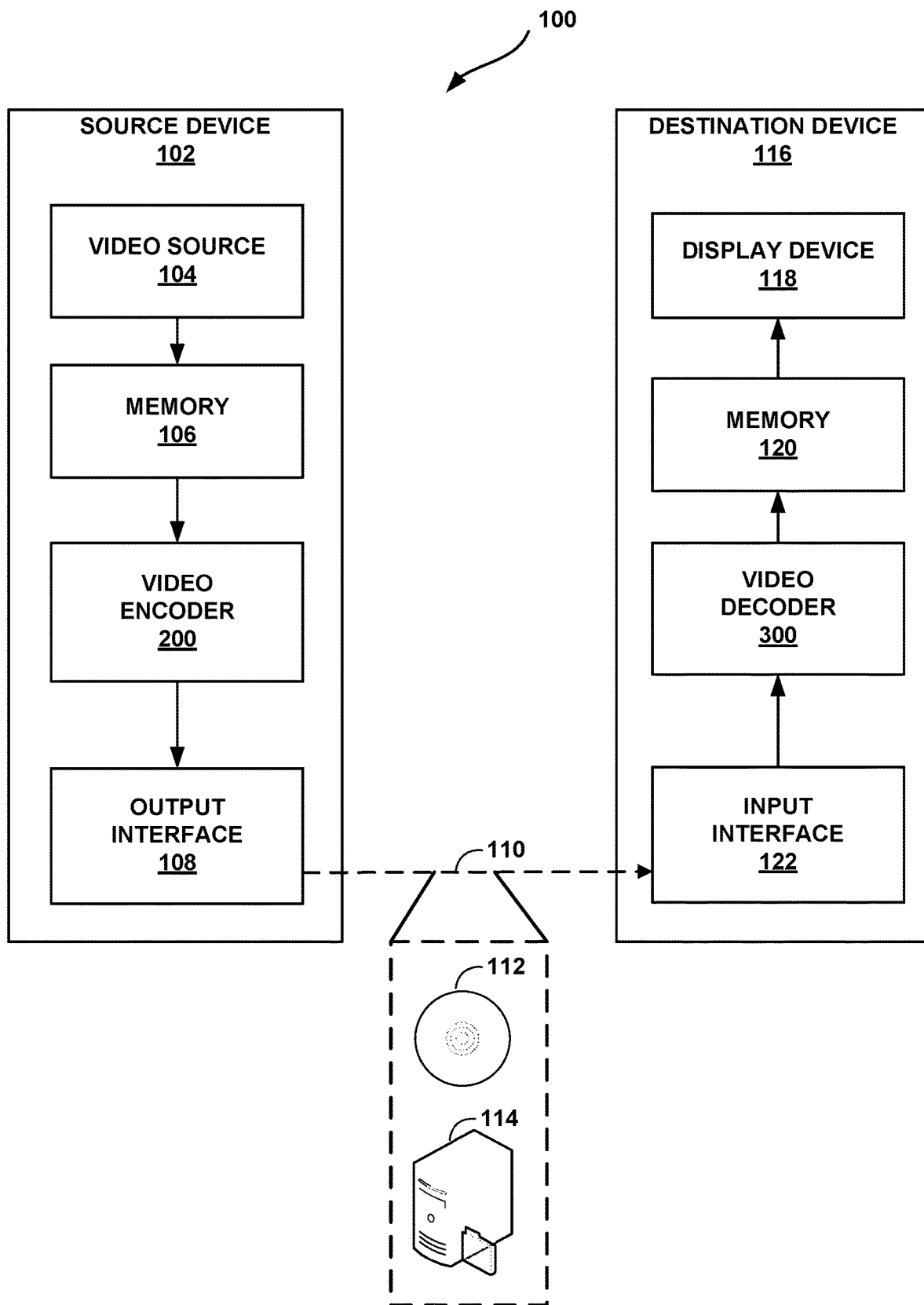
FIG. 1 is a block diagram illustrating an example video encoding and decoding system that may perform the techniques of this disclosure.

In video coding, a video encoder may determine a vector (e.g., motion vector for inter-prediction or block vector for intra block copy (IBC)) for a current block. However, rather than signaling information of the vector for the current block, the video encoder may signal information indicative of a vector predictor (e.g., such as a vector of a neighboring block) and a vector difference between the vector of the current block and the vector predictor.

In one or more examples, rather than or in addition to signaling information of the vector difference, the video encoder and video decoder may construct a vector difference candidate list. The video encoder may signal and video decoder may receive an index into the vector difference candidate list. The video decoder may determine the vector difference based on the index, and determine the vector for the current block based on the vector difference (e.g., summing the vector difference and the vector predictor). The video decoder may determine a prediction block based on the determined vector. The video decoder may also receive, from the video encoder, residual information indicative of a difference between the prediction block and the current block. The video decoder may reconstruct the current block based on the prediction block (e.g., adding the prediction block and the residual information).

In some example techniques, such as in IBC merge mode with block vector differences (IBC-MBVD) mode, a video encoder and a video decoder construct a vector difference candidate list (e.g., block vector difference (BVD) list) of eight candidates for each vector predictor (e.g., block vector predictor (BVP)) using template matching to reorder a set of vector difference candidates (e.g., 80 vector difference candidates).

There may be coding efficiency gains by increasing the number of vector difference candidates (e.g., going from 80 to 1024), such as by increasing granularity of distances between the vector difference candidates and increasing the directions relative to the vector predictor that are evaluated. However, such increases also increase the number of computations. For instance, if template matching is used, there may be 1024 template matching (TM) sum of absolute difference (SAD) calculations for each vector predictor if there are 1024 vector difference candidates, compared to 80 TM SAD calculations if there are 80 vector difference candidates.

This disclosure describes example techniques to add candidates to a subset of vector difference candidates, reorder the candidates (e.g., based on template matching) to derive another subset, and selecting first N number of candidates from the other subset. In this manner, it may be possible to limit the number of candidates that are evaluated (e.g., for each step there are limited number of vector candidates to evaluate), while also allowing for an increase in the granularity and directions of vector candidates that are evaluated.

For example, in IBC-MBVD, in some techniques, a video encoder and a video decoder may be configured to use a predefined list of positions relative to the BVP that the video encoder and the video decoder evaluate. As an example, there may be 80 BVDs that are predefined. The video encoder and video decoder may add each of the 80 BVDs to a BVP, and for each resulting BV candidate (e.g., 80 BV candidates), the video encoder and the video decoder may determine a respective cost value (e.g., using template matching techniques). The video encoder and video decoder may determine the 8 BVDs that resulted in the lowest cost, and reorder the 8 BVDs from lowest cost to highest cost to construct a BVD candidate list.

However, there may be certain issues with such techniques. For instance, because the 80 BVDs are predefined, there may be a BVD that provides better coding gains that is not evaluated. One way to address this issue is to increase the number of BVDs that are evaluated. However, increasing the number of BVDs that are evaluated increases computational complexity and delays processing.

For example, the BVDs that are evaluated may be defined in terms of "pels" that defines a number of samples away from the BVP that the video encoder and the video decoder evaluate. As an example, a distance of 50-pel may mean that the video encoder and the video decoder add or subtract 50 (e.g., the BVD is 50) from the x-coordinate of the BVP, and determine a BV candidate. The video encoder and the video decoder may determine a cost value for this BVD. It may be possible for the video encoder and the video decoder to evaluate at a granularity of 1-pel, 2-pel, 3-pel, 4-pel, and so forth. However, as mentioned above, increasing the granularity of the number of BVDs that are evaluated can be inefficient.

This disclosure describes example techniques to construct a vector difference candidate list based on cost values associated with a first set of vector difference candidates, and determine a second set of vector difference candidates based on the first set of vector difference candidates that are all evaluated for constructing the vector difference candidate list. In this manner, the vector difference candidates (e.g., BVDs) that are evaluated are dynamically determined, and can result in evaluating vector difference candidates that are likely to provide coding gains, as compared to examples where the vector difference candidates are predefined.

For example, the video encoder and the video decoder may determine a vector predictor (e.g., BVP) for a current block, and determine a first set of vector difference candidates based on a first pel-interval. For instance, the first pel-interval may define a first distance between consecutive vector difference candidates in the first set of vector difference candidates starting with the vector predictor. As an example, the video encoder and the video decoder may evaluate BVDs having values of 4-pel, 8-pel, 12-pel, 16-pel, and so until a range threshold is satisfied, or a cost threshold is satisfied. In this example, the first pel-interval may be considered as four because four is the distance between the vector difference candidates starting with the vector predictor. Also, the distance between consecutive vector difference candidates is four (e.g., 4-pel to 8-pel is 4-pel, 8-pel to 12-pel is 4-pel, and so forth).

The video encoder and the video decoder may add candidates to the first set of vector difference candidates that are each a set of positions surrounding a position of the vector predictor and an integer multiple of the first distance away from the vector predictor. For instance, the first vector difference candidate in the first set of vector difference candidates is 4-pel away from the vector predictor, the second vector difference candidate in the first set of vector difference candidates is 2*4-pel (i.e., 8-pel) away from the vector predictor, the third vector difference candidate in the first set of vector difference candidates is 3*4-pel (i.e., 12-pel) away from the vector predictor, and so forth.

The video encoder and the video decoder may determine a second set of vector difference candidates based on the first set of vector difference candidates and a second pel-interval. The second pel-interval may define a second distance between consecutive vector difference candidates in the second set of vector difference candidates. The second pel-interval may be less than the first pel-interval. For example, if the first pel-interval is 4-pel, the second pel-interval may be 2-pel or less than 2-pel.

As an example, the video encoder and the video decoder may include at least a subset of candidates of the first set of vector difference candidates in the second set of vector difference candidates, and add candidates between the subset of candidates of the first set of vector difference candidates based on an integer multiple of the second distance. For example, assume two vector difference candidates from the first set of vector difference candidates are included in the second set of vector difference candidates. If the second pel-interval is 2-pel and the second distance is equal to 2-pel, then the video encoder and the video decoder may add one more vector difference candidate between the two difference candidates from the first set of vector difference candidates to generate the second set of vector difference candidates. If the second pel-interval is 1-pel and the second distance is equal to 1-pel, then the video encoder and the video decoder may add three more vector difference candidates between the two difference candidates from the first set of vector difference candidates to generate the second set of vector difference candidates.

The video encoder and the video decoder may construct a vector difference candidate list based on the second set of vector difference candidates. As one example, the vector difference candidate list may be equal to the second set of vector difference candidates, or a culled version of the second set of vector difference candidates. As another example, the video encoder and the video decoder may iteratively repeat the above steps with smaller and smaller pel-intervals (e.g., shorter and shorter distances) until a pel-interval threshold.

Accordingly, in one or more examples, such as for IBC-MBVD list derivation (e.g., the vector difference candidate list is the IBC-MBVD list), the example techniques allow for adaptive BVD offsets along MBVD directions. For example, the video encoder and the video decoder may perform a MBVD candidates search is a two-step algorithm, or possibly more where iterative steps are performed. The video encoder and the video decoder may start with checking cost values of BVDs added to BVP along each direction with the interval of M-pel. The second step of the search checks cost values for intermediate candidates around the selected candidates from the first step. The candidates with the lowest cost are included into the final MBVD list (e.g., in the vector difference candidate list).

The video encoder may signal an index into the vector difference candidate list, and the video decoder may determine a vector for the current block based on the vector predictor and the vector difference determined from the index (e.g., add the vector predictor and the vector difference). The video decoder may then reconstruct the current block based on the vector for the current block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for vector difference candidate list construction (e.g., motion vector difference (MVD) or block vector difference (BVD) candidate list construction). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for vector difference candidate list construction (e.g., motion vector difference (MVD) or block vector difference (BVD) candidate list construction). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use vector difference candidate list construction (e.g., motion vector difference (MVD) or block vector difference (BVD) candidate list construction).

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with one or more examples, this disclosure is related to intra block copy and inter prediction in video codecs. For instance, the example techniques may be related to deriving a block vector difference candidate list for IBC MBVD (merge mode with block vector difference) mode, IBC AMVP (advanced motion vector prediction) mode, and derive a motion vector difference candidates list for affine MMVD (merge mode with motion vector difference) mode, GEO (geometric partition mode) MMVD mode or MMVD for regular merge mode are disclosed.

The following describes intra-block copy (IBC) merge and advance motion vector prediction (AMVP) list construction. The IBC merge/AMVP list construction may be performed by video encoder 200 and video decoder 300 as follows. Only if an IBC merge/AMVP candidate is valid, it can be inserted into the IBC merge/AMVP candidate list. Above-right, bottom-left, and above-left spatial candidates and one pairwise average candidate can be added into the IBC merge/AMVP candidate list. Template based adaptive reordering (ARMC-TM) is applied to IBC merge list.

The history-based motion vector predictor (HMVP) table size for IBC may be 25. After up to 20 IBC merge candidates are derived with full pruning, the IBC merge candidates are reordered together. After reordering, the first 6 candidates with the lowest template matching costs are selected as the final candidates in the IBC merge list.

The zero vectors' candidates to pad the IBC Merge/AMVP list are replaced with a set of BVP candidates located in the IBC reference region. A zero vector is invalid as a block vector in IBC merge mode, and consequently, it is discarded as BVP in the IBC candidate list.

Figure 6:
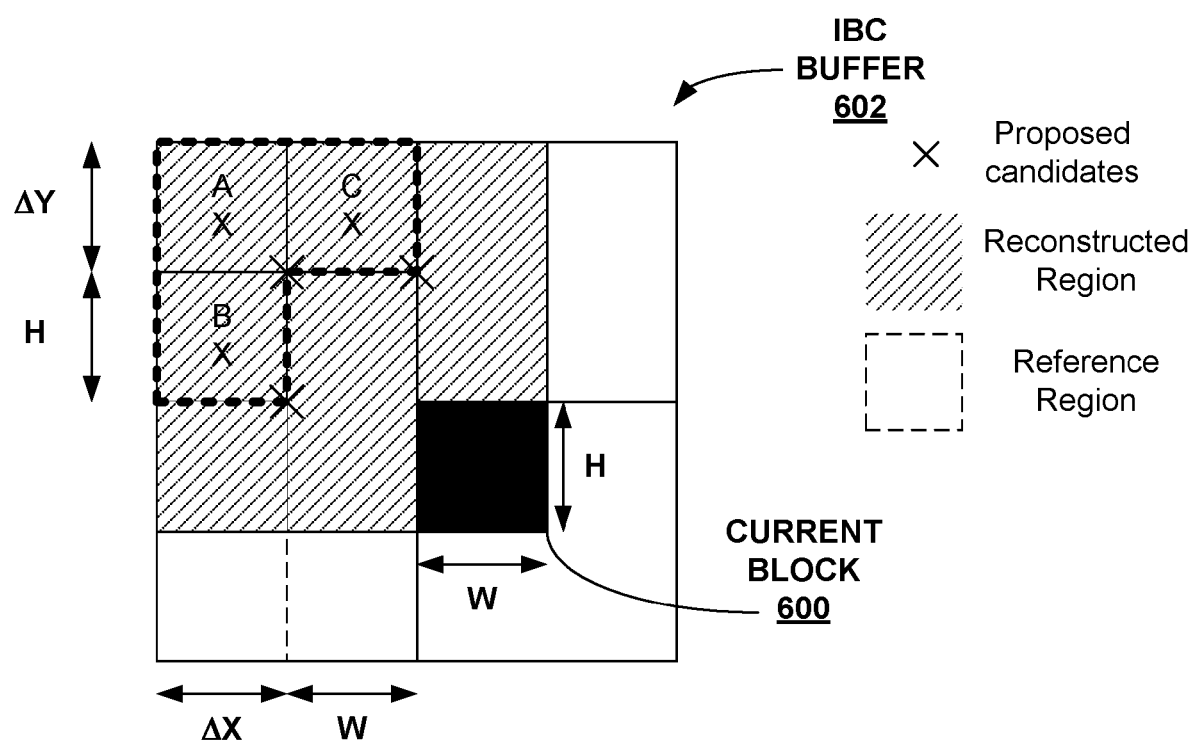
FIG. 6 is a conceptual diagram illustrating an example of padding candidates for the replacement of a zero-vector in an intra-block copy (IBC) list.
Figure 7A:
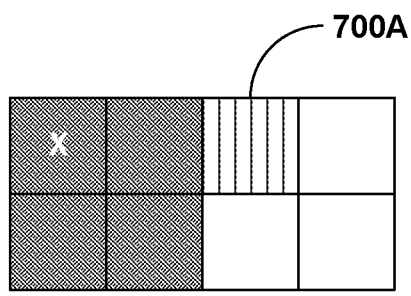
FIGS. 7A-7D are conceptual diagrams illustrating examples of IBC reference region depending on current coding unit (CU) position.
Figure 7B:
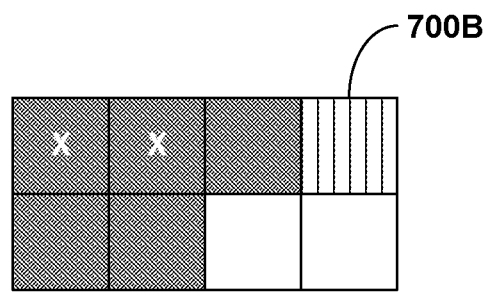
Figure 7C:
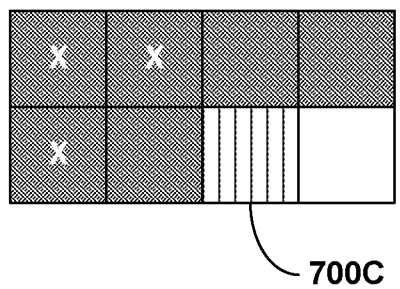
Figure 7D:
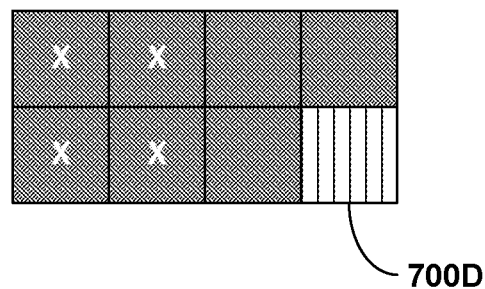

Three candidates are located on the nearest corners of the reference region, and three additional candidates are determined in the middle of the three sub-regions (A, B, and C), whose coordinates are determined by the width, and height of the current block and the $\Delta X$ and $\Delta Y$ parameters, as is depicted in FIG. 6. As one example, FIG. 6 illustrates current block 600 and IBC buffer 602, as well as various parameters used to construct IBC merge/AMVP list for current block 600.

The following describes IBC with template matching. Template Matching (TM) is used in IBC for both IBC merge mode and IBC AMVP mode. The IBC-TM merge list is modified compared to the one used by regular IBC merge mode such that the candidates are selected according to a pruning method with a motion distance between the candidates as in the regular TM merge mode. The ending zero motion fulfillment is replaced by motion vectors to the left (−W, 0), top (0, −H) and top-left (−W, −H), where W is the width and H the height of the current CU.

In the IBC-TM merge mode, the selected candidates are refined with the Template Matching method prior to the RDO (rate distortion optimization) or decoding process. The IBC-TM merge mode has been put in competition with the regular IBC merge mode and a TM-merge flag is signaled.

In the IBC-TM AMVP mode, up to 3 candidates are selected from the IBC-TM merge list. Each of those 3 selected candidates are refined using the Template Matching method and sorted according to their resulting Template Matching cost. Only the 2 first ones are then considered in the motion estimation process as usual.

The Template Matching refinement for both IBC-TM merge and AMVP modes may be based on the IBC motion vectors being constrained (i) to be integer and (ii) within a reference region as shown in FIGS. 7A-7D for current block 700A-700D, respectively. For instance, FIGS. 7A-7D illustrate IBC reference region depending on current CU position of current blocks 700A-700D, respectively. In IBC-TM merge mode, the refinements may be performed at integer precision, and in IBC-TM AMVP mode, the refinements may be performed either at integer or 4-pel precision depending on the AMVR (adaptive motion vector range) value. Such a refinement may access only samples without interpolation. In both cases, the refined motion vectors and the used template in each refinement step may be based on the constraint of the reference region.

Figure 8:
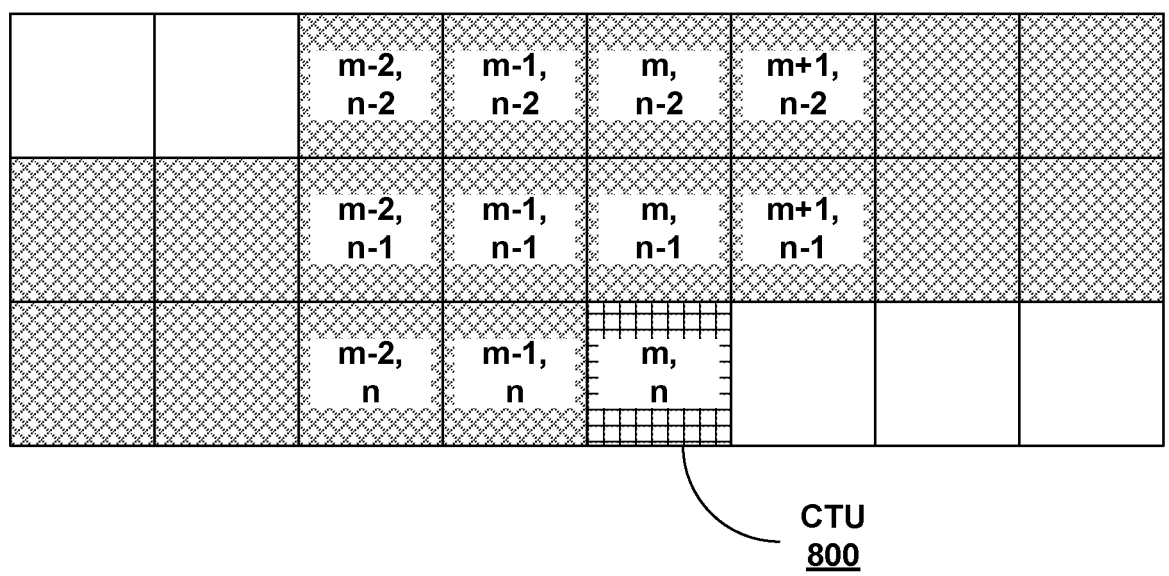
FIG. 8 is a conceptual diagram illustrating an example of a reference area for IBC with coding tree unit (CTU) is coded.

The following describes IBC reference area. The reference area for IBC is extended to two CTU rows above. FIG. 8 illustrates the reference area for coding CTU (m,n) 800. In FIG. 8, the hashed blocks illustrate the reference area, and the clear blocks denote the invalid reference area.

For CTU (m,n) 800 to be coded, the reference area includes CTUs with index (m−2,n−2) . . . (W,n−2), (0,n−1) . . . (W,n−1),(0,n) . . . (m,n), where W denotes the maximum horizontal index within the current tile, slice or picture. When the CTU size is 256, the reference area is limited to one CTU row above. This setting may ensure that for CTU size being 128 or 256, IBC does not require extra memory. The per-sample block vector search (or called local search) range may be limited to [−(C<<1), C>>2] horizontally and [−C, C>>2] vertically to adapt to the reference area extension, where C denotes the CTU size.

The following describes adaptive reordering of merge candidates with template matching (ARMC-TM). The merge candidates are adaptively reordered with template matching (TM). The reordering method is applied to regular merge mode, TM merge mode, and affine merge mode (possibly, excluding the SbTMVP candidate). For the TM merge mode, merge candidates are reordered before the refinement process.

An initial merge candidate list is firstly constructed according to a given checking order, such as spatial, TMVPs (temporal motion vector predictors), non-adjacent, HMVPs, pairwise, virtual merge candidates. Then the candidates in the initial list are divided into several subgroups. For the template matching (TM) merge mode, adaptive DMVR (decoder side motion vector refinement) mode, each merge candidate in the initial list is firstly refined by using TM/multi-pass DMVR. Merge candidates in each subgroup are reordered to generate a reordered merge candidate list, and the reordering is according to cost values based on template matching. Video encoder 200 signals an index of selected merge candidate in the reordered merge candidate list to video decoder 300. For simplification, merge candidates in the last but not the first subgroup may not be reordered. All the zero candidates from the ARMC reordering process are excluded during the construction of Merge motion vector candidates list. The subgroup size is set to 5 for regular merge mode and TM merge mode. The subgroup size is set to 3 for affine merge mode.

For cost calculation, the template matching cost of a merge candidate during the reordering process is measured by the SAD between samples of a template of the current block and their corresponding reference samples. The template comprises a set of reconstructed samples neighboring to the current block. Reference samples of the template are located by the motion information of the merge candidate. When a merge candidate utilizes bi-directional prediction, the reference samples of the template of the merge candidate are also generated by bi-prediction as shown in FIG. 9.

Figure 9:
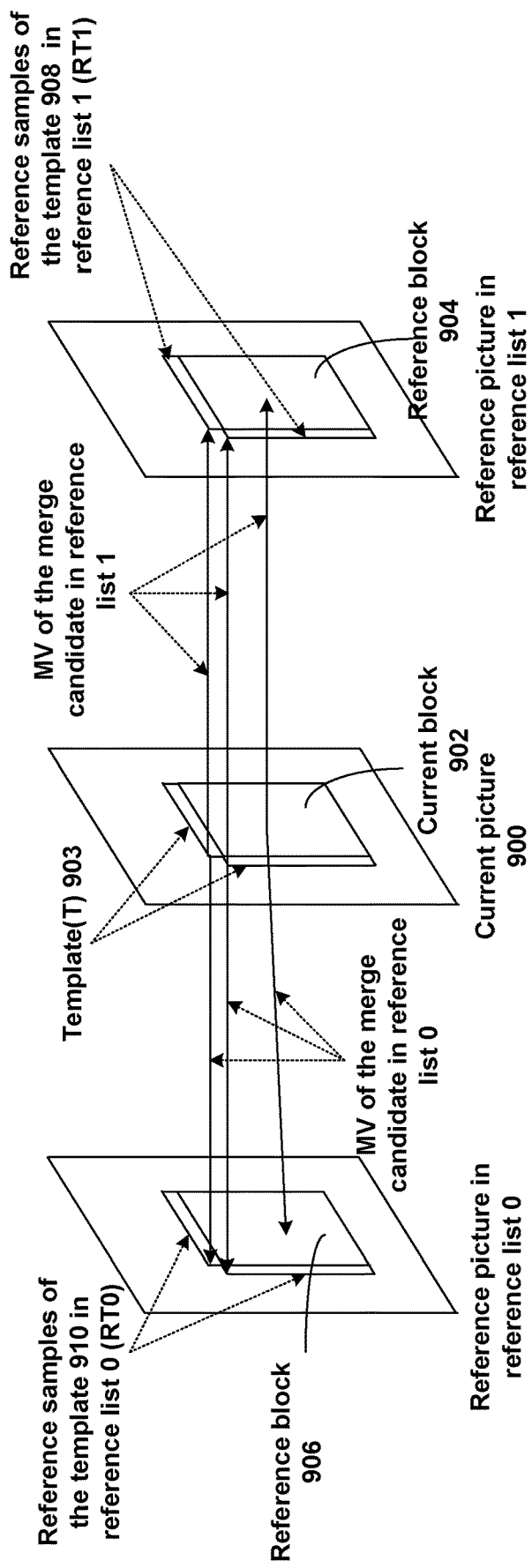
FIG. 9 is a conceptual diagram illustrating an example of template and reference samples of a template in reference pictures.

In FIG. 9, current picture 900 includes current block 902. The template 903 includes samples in current picture 900 that neighbor current block 902. Reference block 906 may be a from a reference picture in list 0. Template 910 may be samples neighboring reference block 906. Reference block 904 may be a from a reference picture in list 1. Template 908 may be samples neighboring reference block 904.

For the refinement of the initial merge candidate list, when multi-pass DMVR is used to derive the refined motion to the initial merge candidate list only the first pass (i.e., PU level) of multi-pass DMVR is applied in reordering. When template matching is used to derive the refined motion, the template size is set equal to 1. Only the above or left template may be used during the motion refinement of TM when the block is flat with block width greater than 2 times of height or narrow with height greater than 2 times of width. TM is extended to perform 1/16-pel MVD precision. The first four merge candidates are reordered with the refined motion in TM merge mode.

Figure 10:
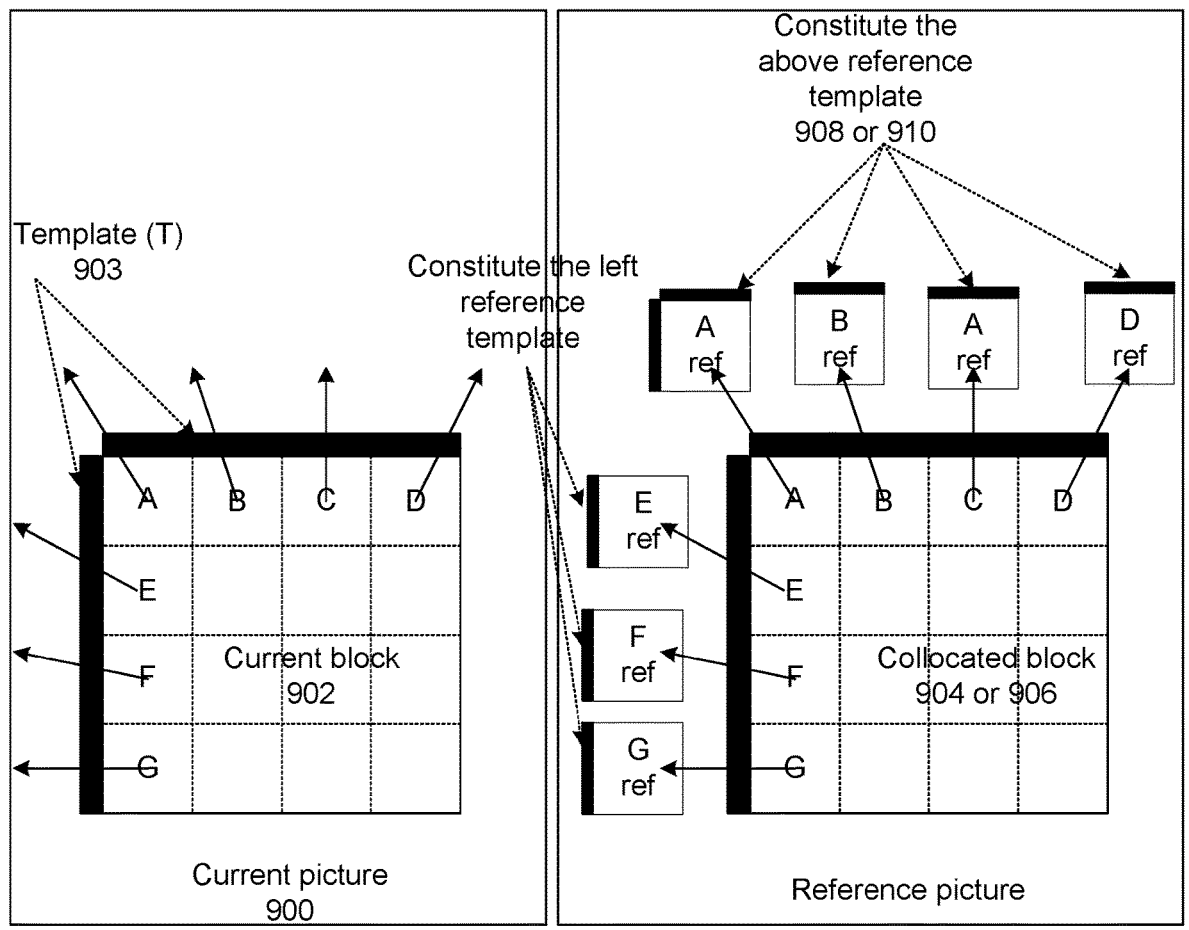
FIG. 10 is a conceptual diagram illustrating an example of template and reference samples for the template for block with sub-block motion using motion information of the sub-blocks of the current block.

For subblock-based merge candidates with subblock size equal to Wsub×Hsub, the above template comprises several sub-templates with the size of Wsub×1, and the left template comprises several sub-templates with the size of 1×Hsub. As shown in FIG. 10, the motion information of the subblocks in the first row and the first column of current block is used to derive the reference samples of each sub-template. FIG. 10 uses the same reference numerals as FIG. 9 referring to the same blocks.

In the reordering process, a candidate is considered as redundant if the cost difference between a candidate and its predecessor is inferior to a lambda value e.g. |D1−D2|<λ, where D1 and D2 are the costs obtained during the first ARMC ordering and λ is the Lagrangian parameter used in the RD (rate distortion) criterion at encoder side.

An algorithm for reordering may be as follows. A video coder (e.g., video encoder 200 or video decoder 300) may determine the minimum cost difference between a candidate and a predecessor of the candidate among all candidates in the list. If the minimum cost difference is superior or equal to λ, the list is considered diverse enough and the reordering stops. If this minimum cost difference is inferior (e.g., less than) to λ, the candidate is considered as redundant and it is moved at a further position in the list. This further position is the first position where the candidate is diverse enough compared to its predecessor.

The algorithm may stop after a finite number of iterations (if the minimum cost difference is not inferior to λ). This algorithm may be applied to the Regular, TM, BM and Affine merge modes. A similar algorithm may be applied to the Merge MMVD and sign MVD prediction methods which also use ARMC for the reordering.

The value of λ is set equal to the λ of the rate distortion criterion used to select the best merge candidate at the encoder side for low delay configuration and to the value λ corresponding to a another QP (quantization parameter) for Random Access configuration. A set of λ values corresponding to each signaled QP offset is provided in the SPS (sequence parameter set) or in the Slice Header for the QP offsets which are not present in the SPS.

The ARMC design is also applicable to the AMVP mode wherein the AMVP candidates are reordered according to the TM cost. For the template matching for advanced motion vector prediction (TM-AMVP) mode, an initial AMVP candidate list is constructed, followed by a refinement from TM to construct a refined AMVP candidate list. In addition, an MVP candidate with a TM cost greater than a threshold, which is equal to five times of the cost of the first MVP candidate, is skipped. In some examples, when wrap around motion compensation is enabled, the MV (motion vector) candidate may be clipped with wrap around offset taken into consideration.

Figure 11:
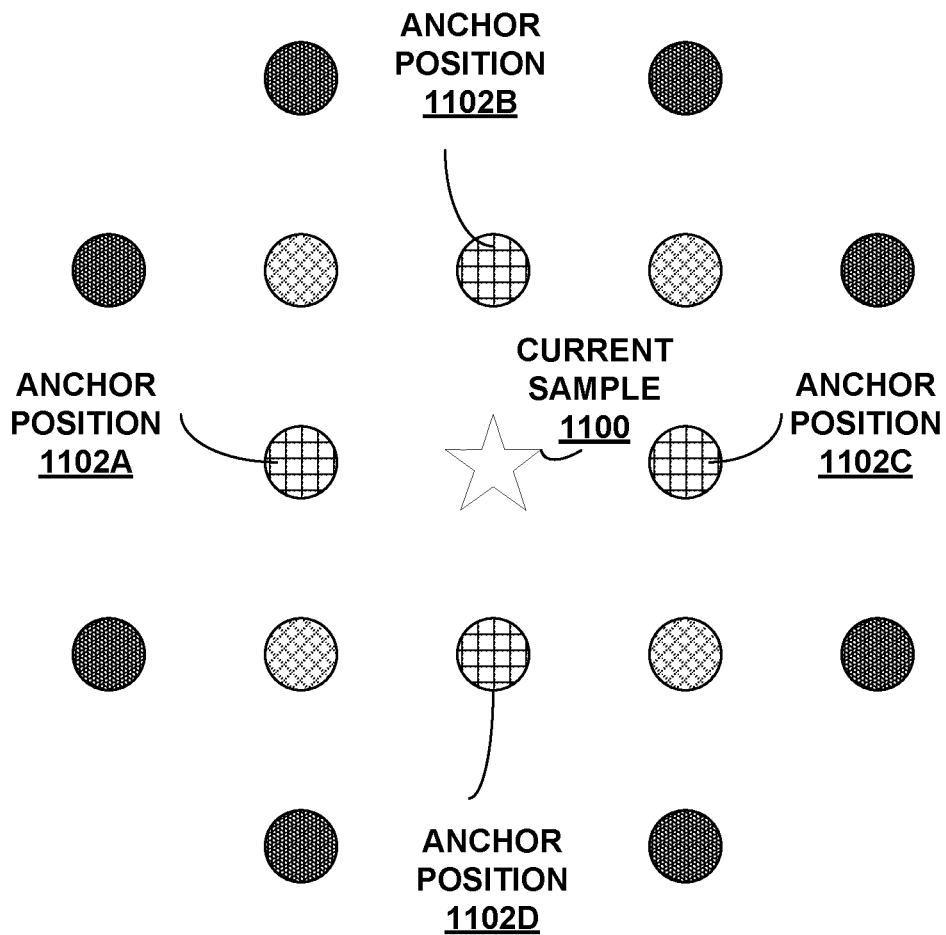
FIG. 11 is a conceptual diagram illustrating examples of additional directions along k*π/8 diagonal angles.

The following describes TM based reordering for MMVD and affine MMVD. The MMVD offsets are extended for MMVD and affine MMVD modes. Additional refinement positions along k×π/8 diagonal angles are added as shown in FIG. 11, thus increasing the number of directions from 4 to 16. FIG. 11 shows current sample 1100, and the additional refinement positions, with anchor positions 1102A-1102D. Based on the SAD cost between the template (one row above and one column left to the current block) and its reference for each refinement position, all the possible MMVD refinement positions (16×6) for each base candidate are reordered. The top ⅛ refinement positions with the smallest template SAD costs are kept as available positions, consequently for MMVD index coding. The MMVD index is binarized by the rice code with the parameter equal to 2. The affine MMVD reordering is extended, in which additional refinement positions along k×π/4 diagonal angles are added. After reordering top ½ refinement positions with the smallest template SAD costs are kept.

The first N motion candidates in the candidate list before being reordered are utilized as the base candidates for MMVD and affine MMVD. N is equal to 3 for MMVD, and [1, 3] depending on the neighboring block affine flags for affine MMVD. Two ways of adding MMVD offsets are allowed, including the 'two-side' and 'one-side,' depending on whether the offset of the other reference picture list is mirrored or directly set to zero. The way in which reordering is applied to one block may be dependent on the TM cost.

The following describes geometric partition mode (GPM) (also called GEO with merge motion vector differences (MMVD)). GPM in VVC is extended by applying motion vector refinement on top of the existing GPM uni-directional MVs. A flag is first signalled for a GPM CU, to specify whether this mode is used. If the mode is used, each geometric partition of a GPM CU can further decide whether to signal MVD or not. If MVD is signalled for a geometric partition, after a GPM merge candidate is selected, the motion of the partition is further refined by the signalled MVDs information. All other procedures are kept the same as in GPM.

The MVD is signaled as a pair of distance and direction, similar as in MMVD. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved in GPM with MMVD (GPM-MMVD). In addition, when pic_fpel_mmvd_enabled_flag is equal to 1, the MVD is left shifted by 2 as in MMVD.

The following describes reconstruction-reordered IBC (RR-IBC). A RR-IBC mode is allowed for IBC coded blocks. When RR-IBC is applied, the samples in a reconstruction block are flipped according to a flip type of the current block (e.g., current blocks 1200 and 1204 in FIGS. 12A and 12B, respectively). At the encoder side, video encoder 200 may flip the original block before motion search and residual calculation, while the prediction block is derived without flipping. At the decoder side, video decoder 300 may flip the reconstruction block to restore the original block.

Two flip methods, horizontal flip and vertical flip, are supported for RR-IBC coded blocks. A syntax flag is firstly signalled for an IBC AMVP coded block, indicating whether the reconstruction is flipped, and if it is flipped, another flag is further signaled specifying the flip type. For IBC merge, the flip type is inherited from neighboring blocks, without syntax signalling. Considering the horizontal or vertical symmetry, the current block (e.g., current blocks 1200 and 1204 in FIGS. 12A and 12B) and the reference block (e.g., reference blocks 1202 and 1206 in FIGS. 12A and 12B) are normally aligned horizontally or vertically. Therefore, when a horizontal flip is applied, the vertical component of the BV (block vector) is not signaled and inferred to be equal to 0. Similarly, the horizontal component of the BV is not signaled and inferred to be equal to 0 when a vertical flip is applied.

Figure 12A:
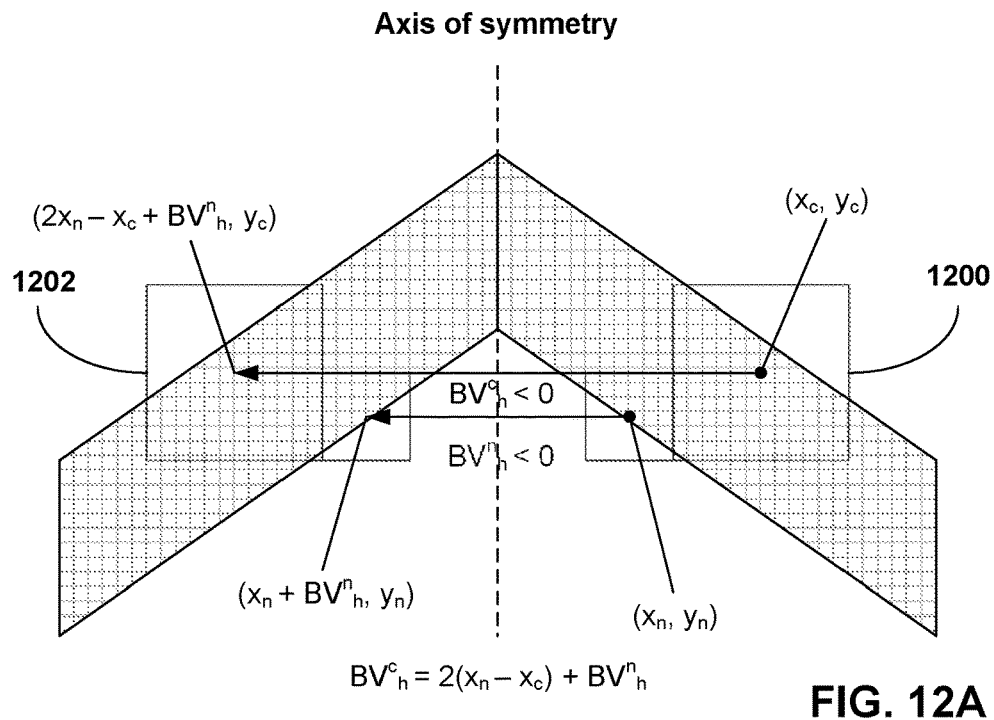
FIGS. 12A and 12B are conceptual diagrams illustrating block vector (BV) adjustment for horizontal flip and vertical flip, respectively.
Figure 12B:
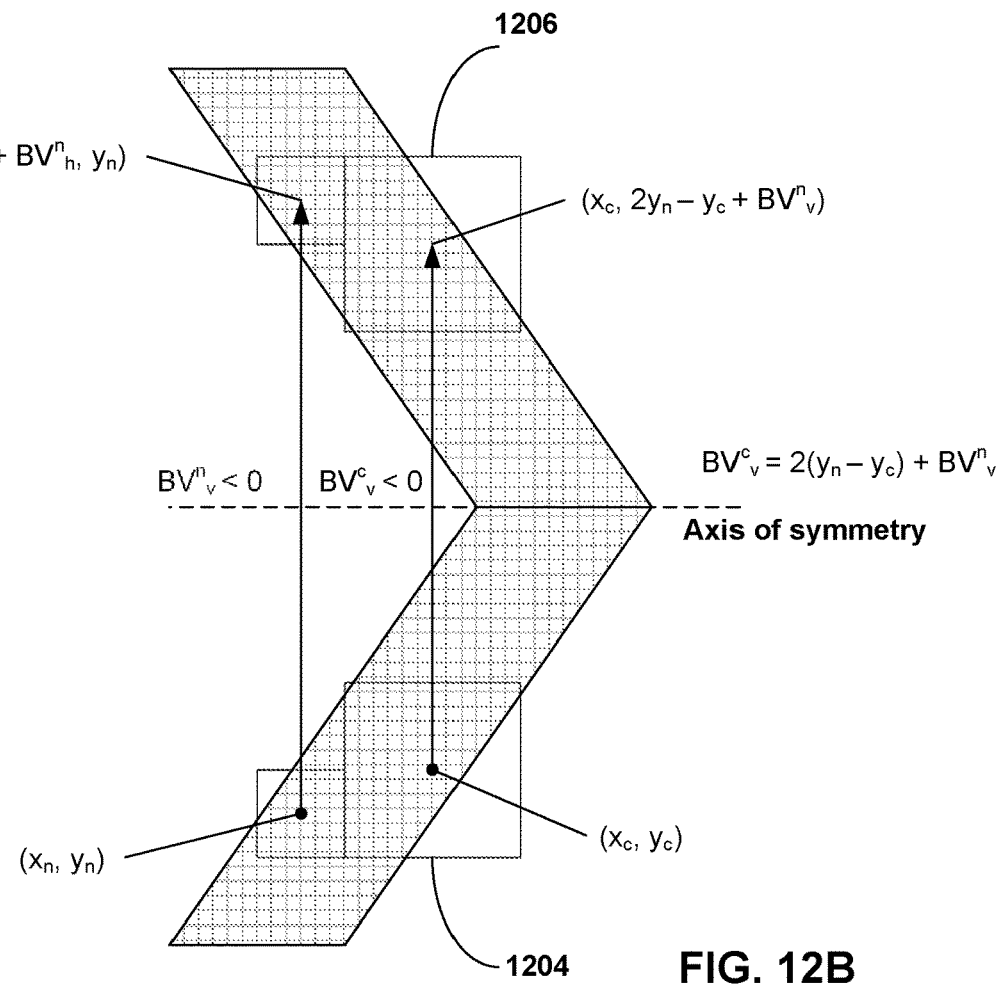

To utilize the symmetry property, a flip-aware BV adjustment approach is applied to refine the block vector candidate. For example, as shown in FIGS. 12A and 12B, (xnbr, ynbr) and (xcur, ycur) represent the coordinates of the center sample of the neighboring block and the current block 1200 and 1204, respectively, BVnbr and BVcur denotes the BV of the neighboring block and the current block, respectively. Instead of directly inheriting the BV from a neighboring block, the horizontal component of BVcur is calculated by adding a motion shift to the horizontal component of BVnbr (denoted as BVnbrh) in case that the neighboring block is coded with a horizontal flip, i.e., BVcurh=2(xnbr−xcur)+BVnbrh. Similarly, the vertical component of BVcur is calculated by adding a motion shift to the vertical component of BVnbr (denoted as BVnbrv) in case that the neighboring block is coded with a vertical flip, i.e., BVcurv=2(ynbr−ycur)+BVnbrv.

The following describes IBC merge mode with block vector differences (IBC-MBVD). Affine-MMVD and GPM-MMVD have been adopted to ECM (enhanced compression model) as an extension of regular MMVD mode. It may be possible to extend the MMVD mode to the IBC merge mode.

In IBC-MBVD, the distance set is {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}, and the BVD directions are two horizontal and two vertical directions.

The base candidates are selected from the first five candidates in the reordered IBC merge list. Based on the SAD cost between the template (one row above and one column left to the current block) and its reference for each refinement position, all the possible MBVD refinement positions (20×4) for each base candidate are reordered. The top 8 refinement positions with the lowest template SAD costs are kept as available positions, consequently for MBVD index coding. The MBVD index is binarized by the rice code with the parameter equal to 1. An IBC-MBVD coded block may not inherit flip type from a RR-IBC coded neighbor block.

Figure 17:
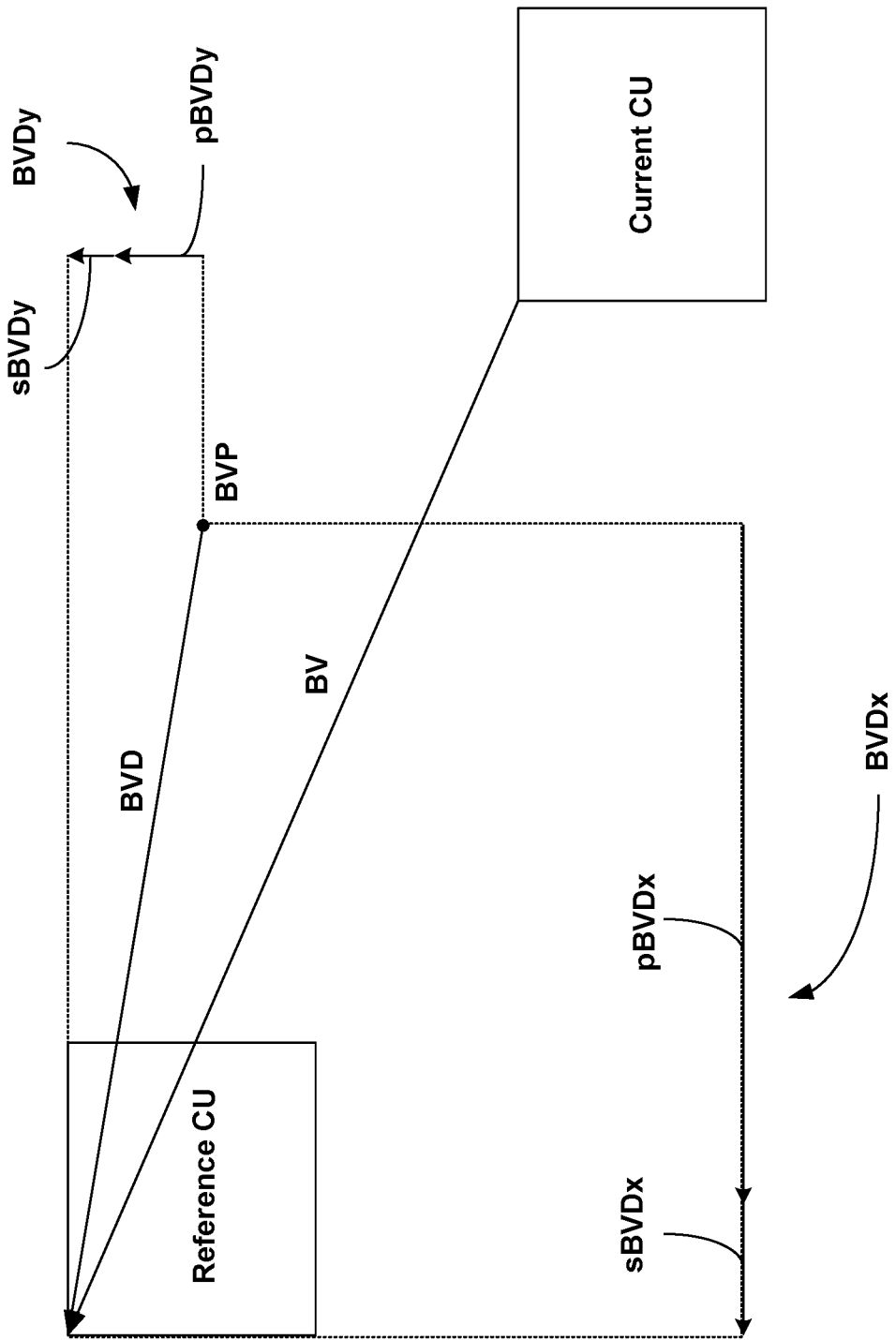
FIG. 17 is a conceptual diagram illustrating an example of an advanced motion vector prediction (AMVP) process.

FIG. 17 is a conceptual diagram illustrating an example of an advanced motion vector prediction (AMVP) process. For coding as part of the AMVP, Table 1 includes some example values.

TABLE 1

| | BVD value | | | | | | |
|---|---|---|---|---|---|---|---|
| | 0-1 | 2-5 | 6-13 | 14-29 | 30-61 | 62-125 | 126-253 |
| Prefix | 0 | 2 | 6 | 14 | 30 | 62 | 126 |
| Suffix bins | 1 | 2 | 3 | 4 | 5 | 6 | 7 |
| Suffix values | 0-1 | 0-3 | 0-7 | 0-15 | 0-31 | 0-63 | 0-127 |

The AMVP process may be as follows. Block vector (BV) is found by the full search. BVP (block vector predictor) selected from BVP candidate list, this list is sorted as described above with respect to IBC merge/AMVP list construction. Block vector difference (BVD) is calculated in the following way BVD=BV−BVP.

The BVD signaling may be as follows. Split the BVD into prefix and suffix for each of the component horizontal and vertical (BVDx=pBVDx+sBVDx, BVDy=pBVDy+sBVDy,). The first five bins of prefix are context coded. The suffix is coded using a fixed length code, where the length depends on the prefix value.

There may be certain problems with constructing vector difference candidate list. For instance, in current ECM, IBC merge mode with block vector differences (IBC-MBVD) mode derives a BVD candidates list of 8 candidates for each block vector predictor (BVP) by using template match to reorder 80 candidates. The 80 candidates may have a distance to the BVP from a distance set of {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}, and in two horizontal and two vertical directions. The distance set may be predefined and pre-stored. For instance, there are 20 BVPs in the distance set, multiplied by two horizontal and two vertical directions results in 80 candidates (e.g., 20*2*2).

For instance, video encoder 200 and video decoder 300 may be configured to evaluate cost values (e.g., TM cost values) for each of the 80 candidates, and no other candidates. That is, there may be no dynamic determination of which candidates are evaluated for construction of the vector difference candidate list, in some current techniques.

An increase in the granularity of distance set and increase the number of directions may increase coding performance in term of BD-rate. However, reordering all candidates to derive the final BVD candidate list of 8 candidates may result in significant coding time increase in both encoder and decoder side. As an example, set the distance set of 128 values: {1-pel, 2-pel, 3-pel, 4-pel, . . . 127-pel, 128-pel} with 4 direction requires 512 TM SAD calculation (e.g., 128*4) for each BVP compared to 80 TM SAD calculation of current ECM.

Stated another way, the 80 candidates identified above do not include 5-pel, 6-pel, 7-pel, 9-pel, 10-pel, and many others in either direction, but it may be possible that such candidates provide relatively good coding gains. To include such candidates, it may be possible for video encoder 200 and video decoder 300 to evaluate every single possible candidate. Again, a candidate may be considered as a distance away from the vector predictor (e.g., BVD of 1-pel defines a distance away from the vector predictor, such as 1-pel away). However, including every single candidate can drastically increase processing time.

The current ECM supports IBC search range to be 2 times of CTU size. Accordingly, the maximum offset of BVD set may be increased to 256-pel. The above example requires 1024 TM SAD (e.g., 256*4) calculation for each BVP compared to 80 TM SAD calculation of current ECM.

This disclosure describes example techniques to construct a vector difference candidate list (e.g., a BVD or a MVD candidate list) to achieve a good trade-off in term of coding performance and coding time. For instance, video encoder 200 and video decoder 300 may determine a set of vector difference candidates (e.g., a set of BVD or MVD candidates).

As an example, the following is described with respect to block vectors, block vector predictors, and block vector difference candidates. However, the example techniques may be applicable to block vector or motion vectors. That is, the example techniques with respect to BV (block vector) or BVP (block vector predictor) may be used with respect to MV (motion vector) or MVP (motion vector predictor).

Given a block vector predictor (e.g., BVP) of position (horOrg, verOrg), video encoder 200 and video decoder 300 may construct a BVD candidate list (bvdCandListN) which has at most N candidates from a set of BVD candidates (bvdCandsSet) by using TM to select the N candidates with minimum TM cost. Video encoder 200 may signal an index in the bitstream to indicate which candidate is used with the BVP for video decoder 300 to derive the final BV of the current IBC block.

In one example, bvdCandsSet is predefined to be a set of positions surrounding of the BVP position. A predefined set is determined by defining directions, maximum offset along a direction and interval between two candidates along a direction. For example, one predefined set could be 4 directions of two horizontal and two vertical directions, maximum offset 256-pel with interval 1-pel between each two BVD candidates along each direction. In total, there are 256×4=1024 BVD candidates in bvdCandsSet.

In one example, bvdCandsSet is all possible positions surrounding of the BVP position. In this example, a BVD candidate has a offset of (horBvd, verBvd), wherein the value of horBvd is in a value range of {−maxRange, +maxRange}, and the value of verBvd is in a value range of {−maxRange, +maxRange}. The value of maxRange is either a predefined value, e.g., 256 (as two times of CTU width) or a value that is signaled in the bitstream as a high-level syntax value.

Accordingly, in one or more examples, video encoder 200 and video decoder 300 may determine the set of vector difference candidates based on a set of positions surrounding a position of the vector predictor. The set of positions may include all positions surrounding the position of the vector predictor or less than all positions surrounding the position of the vector predictor. In some examples, video encoder 200 and video decoder 300 may utilize this set of vector difference candidates to construct the vector difference candidate list.

In one example, video encoder 200 and video decoder 300 may select a subset of bvdCandsSet (bvdCandsSubSet) and reorder the subset by using TM, the first N candidates of bvdCandsSubSet with minimum TM cost is used to derive bvdCandListN. In this example, the total number of candidates in bvdCandsSet is P and the total number of candidates in bvdCandsSubSet is Q, where N is smaller than Q and Q is smaller than P. Accordingly, in some examples, video encoder 200 and video decoder 300 may determine a subset of vector difference candidates from the set of vector difference candidates. In some examples, video encoder 200 and video decoder 300 may utilize this subset of vector difference candidates to construct the vector difference candidate list.

Video encoder 200 and video decoder 300 may be configured to construct a vector difference candidate list based on the set of vector difference candidates. For instance, video encoder 200 and video decoder 300 may derive a candidate list from a subset of a predefined set of BVD candidates.

As an example, bvdCandsSet (e.g., a set of vector difference candidates) is a predefined set of T1 directions, with maximum offset of T2-pel along each direction, and interval of T3-pel between each two candidates along each direction. In this example, the total number of candidates P=T1×T2÷T3.

The derivation (e.g. construction) of bvdCandListN (e.g., a vector difference candidate list) may be defined as follows. In step 1, video encoder 200 and video decoder 300 may compose a subset bvdCandsStep1Input by selecting a candidate along each direction starting at S1-pel and ends at T2-pel, with interval of S1-pel between each two candidates, e.g. {S1-pel, 2×S1-pel, 3×S1-pel, 4×S1-pel, . . . , T2-pel}.

For example, video encoder 200 and video decoder 300 may determine a first set of vector difference candidates based on a first pel-interval (e.g., S1-pel). In this example, the first pel-interval (e.g., S1-pel) defines a first distance between consecutive vector difference candidates in the first set of vector difference candidates starting with the vector predictor. For instance, if the candidates in the first set of vector difference candidates is S1-pel, 2*S1-pel, and 3*S1-pel, then the distance between S1-pel and 2*S1-pel is S1-pel, and the distance between 2*S1-pel and 3*S1-pel is also S1-pel, and so forth. In one or more examples, to determine the first set of vector difference candidates, video encoder 200 and video decoder 300 may add candidates to the first set of vector difference candidates that are each a set of positions surrounding a position of the vector predictor and an integer multiple of the first distance away from the vector predictor. For instance, the integer multiples may be 1, 2, 3, 4, and so forth.

Video encoder 200 and video decoder 300 may add candidates to the first set of vector difference candidates until a range threshold is satisfied. For instance, video encoder 200 and video decoder 300 may keep adding candidates to the first set of vector difference candidates until a distance away from the vector predictor is equal to T2-pel. That is, the candidates may be S1-pel, 2*S1-pel, 3*S1-pel until T2-pel.

Video encoder 200 and video decoder 300 may use TM to reorder all candidates in bvdCandsStep1Input to derive a subset bvdCandsStep1Output by selecting first N candidates that has minimum TM cost. In one or more examples, T3<S1≤T2. The total number of candidates in bvdCandsStep1Input may be equal to T1×T2÷S1. In some examples, some candidates in bvdCandsStep1Input are not valid BVD, and the total number of TM is equal or smaller than T1×T2÷S1. Examples for determining a valid BVD are described below.

In step 2, video encoder 200 and video decoder 300 may determine a second set of vector difference candidates based on the first set of vector difference candidates and a second pel-interval. The second pel-interval may define a second distance between consecutive vector difference candidates in the second set of vector difference candidates, and the second pel-interval may be less than the first pel-interval. For instance, in the above example if the first pel-interval (e.g., S1-pel) is 4-pel, the second pel-interval (e.g., S2-pel) may be less than the first pel-interval (e.g., 1-pel, 2-pel, or 3-pel).

For example, in step 2, video encoder 200 and video decoder 300 may compose a subset bvdCandsSubSetStep2Input by inserting a candidate in bvdCandsStep1Output (candStep1Output) and selecting a candidate with a distance S2-pel to the candStep1Output along the direction of the candStep1Output, e.g. {candStep1Output−S2, candStep1Output, candStep1Output+S2}. That is, video encoder 200 and video decoder 300 may include at least a subset of candidates of the first set of vector difference candidates in the second set of vector difference candidates (e.g., one or more candidates of bvdCandsStep1Output may be in the second set of vector difference candidates). Video encoder 200 and video decoder 300 may add candidates between the subset of candidates of the first set of vector difference candidates based on an integer multiple of the second distance. For example, based on above example, if candStep1Output is one of the candidates of the first set of vector difference candidates that is also in the second set of vector difference candidates, then candStep1Output−S2 and canStep1Output+S2 would be included in the second set of vector difference candidates and would be between two candidates of the first set of vector difference candidates.

Video encoder 200 and video decoder 300 may use TM to reorder all candidates in bvdCandsStep2Input to derive a subset bvdCandsStep2Output by selecting first N candidates that have minimum TM cost. In one or more examples, T3≤S2<S1. The total number of candidates in bvdCandsStep2Input may be equal to N×3. Similar to above, some candidates in bvdCandsStep2Input may not be valid BVD, and the total number of TM is equal or smaller than N×2.

In step X, video encoder 200 and video decoder 300 may repeat step 2 by reducing the distance to S(x)-pel, such as where, T3≤S(x)<S<S(x−1). The total number of candidates in bvdCandsStepXInput may be equal to N×3. Video encoder 200 and video decoder 300 may use TM to reorder all candidates in bvdCandsStepXInput to derive a subset bvdCandsStepXOutput by selecting first N candidates that has minimum TM cost. Similar to above, some candidates in bvdCandsStepXInput may not be valid BVD, and the total number of TM is equal or smaller than N×2.

Video encoder 200 and video decoder 300 may terminate the process when S(x) is equal to T3 or when a terminate criteria is reached, for example, the TM cost of last candidate of N candidates is equal or smaller than a threshold (e.g., a cost threshold). The bvdCandListN is derived as the last step output subset bvdCandsStepXOutput. That is, video encoder 200 and video decoder 300 may add candidates until a range threshold is satisfied (e.g., the distance away from the vector predictor is equal to T2-pel) or until a cost value associated with a candidate satisfies a cost threshold (e.g., the cost of a candidate is less than or equal to a cost threshold).

In this manner, to construct the vector difference candidate list, video encoder 200 and video decoder 300 may be configured to determine a first subset of the set of vector difference candidates based on one of selection of candidates along each direction with different pels or selection of candidates along each direction with different pels and reordering (e.g., such as in the example step 1 described above). Video encoder 200 and video decoder 300 may repeatedly determine one or more additional subsets of vector difference candidates by adding candidates at different pel distances based on a previous subset of the set of vector difference candidates (e.g., such as in step 2 followed by the iterative process through step X described above). In this example, a final subset of vector difference candidates from additional subsets is the vector difference candidate list.

As described above, there may be instances where a vector difference candidate is not valid. In one example, a valid BVD is determined by add the BVD to BVP to derive a BV and the BV should be in the search range of the current block, e.g., inside a picture boundary and inside a predefined search range of a block vector. In one example, when a BVP is derived from a neighbor block, and the neighbor block is coded with horizontal flip type, a valid BVD has a vertical component value that is equal to 0. In one example, when a BVP is derived from a neighbor block, and the neighbor block is coded with vertical flip type, a valid BVD has a horizontal component value that is equal to 0. In one example, when the current block is determined to be coded with horizontal flip type, a valid BVD has a vertical component value that is equal to 0. In one example, when the current block is determined to be coded with vertical flip type, a valid BVD has a horizontal component value that is equal to 0.

Accordingly, video encoder 200 and video decoder 300 may be configured to determine that a vector difference candidate in the vector difference candidate list is valid based on one or more of the following. Video encoder 200 and video decoder 300 may determine that the vector difference candidate when summed with the vector predictor results in a hypothetical vector within a search range.

In a condition where the vector predictor is derived from a neighbor block, and the neighbor block is coded with horizontal flip type, video encoder 200 and video decoder 300 may determine that the vector difference candidate has a vertical component value that is equal to 0. In a condition where the vector predictor is derived from a neighbor block, and the neighbor block is coded with vertical flip type, video encoder 200 and video decoder 300 may determine that the vector difference candidate has a horizontal component value that is equal to 0.

In a condition where the current block is coded with horizontal flip type, video encoder 200 and video decoder 300 may determine that the vector difference candidate has a vertical component value that is equal to 0. In a condition where the current block is coded with vertical flip type, video encoder 200 and video decoder 300 may determine that the vector difference candidate has a horizontal component value that is equal to 0.

To determine the value of S1-pel, video encoder 200 and video decoder 300 may determine the value of S1 based on satisfaction of at least one of the following conditions: $T3<S1 \leq T2$ and the total number of candidates in bvdCandsStep1Input is equal or greater than N, and/or S1=T3 and the total number of candidates in bvdCandsSet us equal or smaller than N.

In one example, the value of S1 (e.g., the first pel-interval) is a predefined value, e.g., S1 is equal to 32. In one example, the value of S1 is a value that is signaled in the bitstream as a high-level syntax parameter. In one example, the value of S1 is first determined to be a value K as a predefined value or a value that is signaled in the bitstream, and the total number of valid BVD candidates in bvdCandsStep1Input is smaller than N, the value of S1 is then set to a value L, wherein L is smaller than K. The total number of candidates in bvdCandsStep1Input is equal or greater than N. In one example, when the value of S1 is set to equal to 32 (K), and the total number of candidates in bvdCandsStep1Input is smaller than N, video encoder 200 and video decoder 300 may try to set the value of S1 to be 16, and the total number of candidates in bvdCandsStep1Input is smaller than N, video encoder 200 and video decoder 300 may try to set the value of S1 to be 8 (L), and the total number of candidates in bvdCandsStep1Input is greater than N.

In one example, the total number of valid BVD candidates in bvdCandsSet is equal or smaller than N, the value of S1 is determined to be equal to T3, and the bvdCandsStep1Input is all valid candidates in bvdCandsSet.

In one example, video encoder 200 and video decoder 300 may determine the value of S(x) by the value of S1 and T3. For instance, the value of S(x) may be in the value range of $T3 \leq S(x) < S1$.

In one example, the value of S(x) is a function of F(T3, S1). In one example, the value of S(x) is a set of values: {S½, S¼, S⅛, . . . T3}. In one example, the value of S1 is equal to 32 and the value of T3 is equal to 1, the value of S(x) is that S2=16, S3=8, S4=4, S5=2, S6=1. That is, the first pel-interval, second pel-interval may define integer distances or fractional distances.

In one or more examples, video encoder 200 and video decoder 300 may determine a threshold value TH as a function of current block width and height. When the N-th selected candidate has a TM cost that is equal or smaller than TH, the bvdCandListN derivation process is terminated. In one example, the value of TH is equal to 1.

In one example, when both the above and left template is available, the value of TH is equal to F*(width+height). In one example, when the above template is available, the value of TH is equal to F*width. In one example, when the left template is available, the value of TH is equal to F*height. F is a factor, width is the block width in pel and height is the block height in pel. In any step of the bvdCandListN derivation (e.g., construction) process, when the early terminate criteria is fulfilled, video encoder 200 and video decoder 300 may terminate the bvdCandListN derivation process.

Accordingly, in one or more examples, video encoder 200 and video decoder 300 may determine a threshold size (e.g., TH above) for the set of vector difference candidates based on block size of the current block. To determine the set of vector difference candidates, video encoder 200 and video decoder 300 may determine the set of vector difference candidates until a number of vector difference candidates is equal to the threshold size.

The following is an example technique for constructing a vector difference candidate list based on a set of vector difference candidates that video encoder 200 and video decoder 300 may perform.

In this example, bvdCandsSet is a predefined set of two horizontal and two vertical directions (T1=4), with a maximum offset is equal to be 256-pel (T2=256), and interval of 1-pel (T3=1). The total number of candidates in bvdCandsSet is equal to $P = T1 \times T2 \div T3 = 4 \times 256 \div 1 = 1024$.

The construction of bvdCandListN (e.g., a vector difference candidate list) is as follows. In step 1, video encoder 200 and video decoder 300 may compose a subset bvdCandsStep1 Input by selecting a candidate along each direction starting at 8-pel and ends at 256-pel, with interval of 8-pel (S1=8) between each two candidates. That is, in this example, video encoder 200 and video decoder 300 may determine a first set of vector difference candidates based on a first pel-interval (e.g., 8-pel interval). The first pel-interval defines a first distance between consecutive vector difference candidates in the first set of vector difference candidates starting with the vector predictor. For example, along each direction, the candidate distance to the BVP (i.e., vector predictor) is {8-pel, 16-pel, 24-pel, 32-pel, . . . , 248-pel, 256-pel}.

For instance, video encoder 200 and video decoder 300 may add candidates to the first set of vector difference candidates (e.g., bvdCandsStep1Input) that are each a set of positions surrounding a position of the vector predictor and an integer multiple of the first distance away from the vector predictor. For instance, the integer multiple of the first distance away from the vector predictor equals 1*8-pel, 2*8-pel (16-pel), 3*8-pel (24-pel), and so forth. In some examples, video encoder 200 and video decoder 300 may add candidates to the first set of vector difference candidates until a range threshold is satisfied (e.g., until a BVD that is 256-pel away from the BVP) and/or until a candidate of the first set of vector difference candidates satisfies a cost threshold (e.g., a TM cost of a candidate is less than or equal to a cost threshold).

Figure 13:
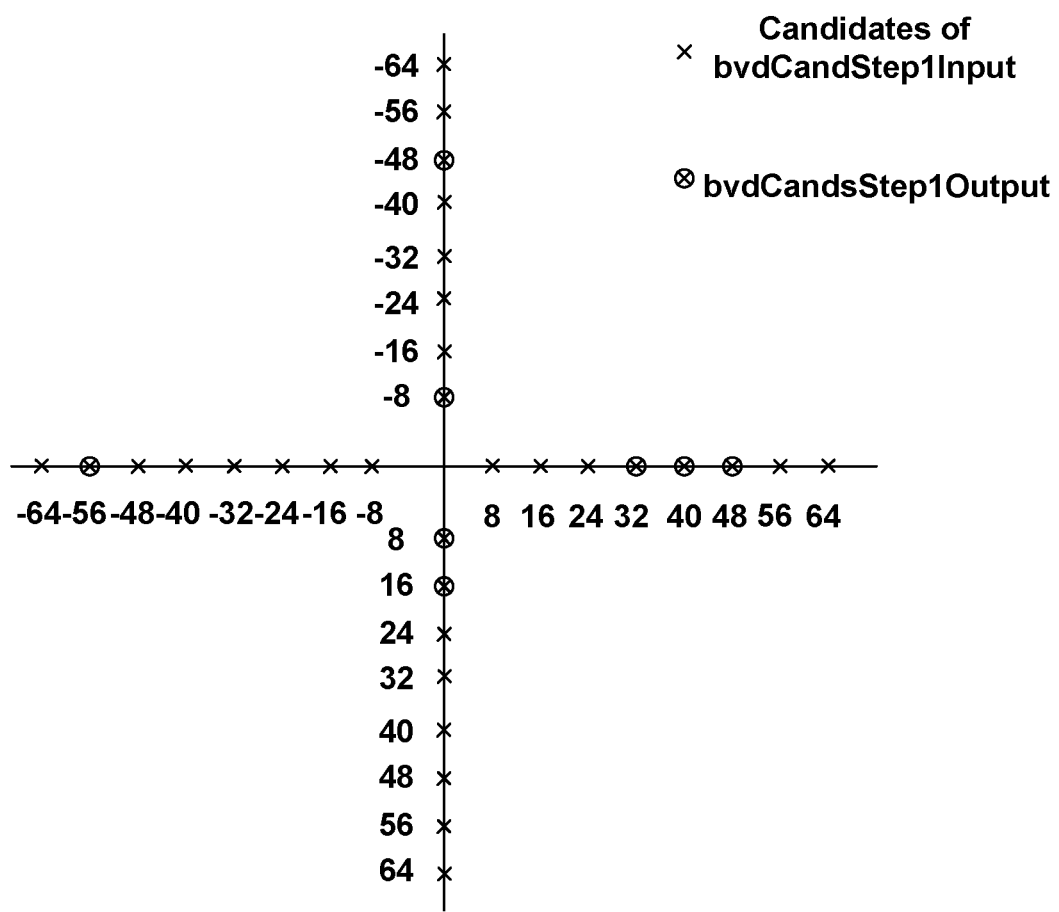
FIG. 13 is a conceptual diagram illustrating a first derivation step for a vector difference candidate list.

The total number of TM is equal or smaller than T1×T2÷S1=4×256÷32=32. Video encoder 200 and video decoder 300 may use TM to reorder all candidates in bvdCandsStep1Input to derive a subset bvdCandsStep1Output by selecting first N=8 candidates that has minimum TM cost. In FIG. 13, the candidates of bvdCandsStep1Output are (−56, 0), (32, 0), (40, 0), (48, 0), (0, −48), (0, −8), (0, 8) and (0, 16). For example, video encoder 200 and video decoder 300 may determine respective cost values associated with candidates of the first set of vector difference candidates, and construct a first subset of vector difference candidates based on the respective cost values.

For instance, in this example, to determine respective cost values associated with candidates of the first set of vector difference candidates video encoder 200 and video decoder 300 may determine a first cost value based on template matching between a reference template for a vector that equals the BVP plus or minus 8-pel (e.g., based on above and left samples of a block pointed to by the vector) and a template of the current block (e.g., based on above and left samples of the current block), determine a second cost value based on template matching between a reference template for a vector that equals the BVP plus or minus 16-pel and the template of the current block, and so forth. Video encoder 200 and video decoder 300 may construct a first subset of vector difference candidates based on the respective cost values (e.g., determine the 8 BVDs with the lowest cost values). One example of the first subset of vector difference candidates is bvdCandsStep1Output.

Figure 14:
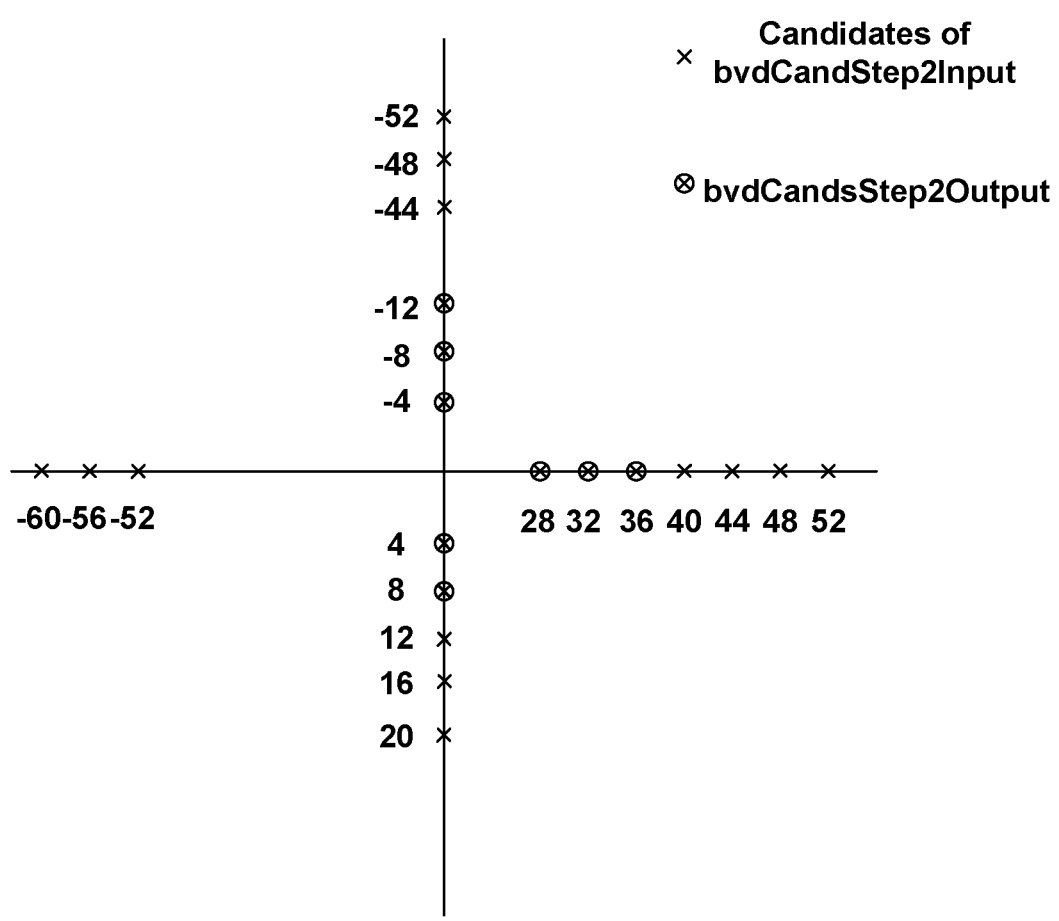
FIG. 14 is a conceptual diagram illustrating a second derivation step for the vector difference candidate list.

In step 2, video encoder 200 and video decoder 300 may compose a subset bvdCandsSubSetStep2Input by inserting a candidate in bvdCandsStep1Output (candStep1Output) and selecting a candidate with a distance 4-pel (S2=4) to the candStep1Output along the direction of the candStep1Output. The total number of TM is equal or smaller than N×2=8×2=16. Video encoder 200 and video decoder 300 may use TM to reorder all candidates in bvdCandsStep2Input to derive a subset bvdCandsStep2Output by selecting first N=8 candidates that has minimum TM cost. In FIG. 14, the candidates of bvdCandsStep2Input are (−60, 0), (−56, 0), (−52, 0), (28, 0), (32, 0), (36, 0), (40, 0), (44, 0), (48, 0), (52, 0), (0, −52), (0, −48), (0, −44), (0, −12), (0, −8), (0, −4), (0, 4), (0, 8), (0,12), (0, 16) and (0, 20). The candidates of bvdCandsStep2Output are (28, 0), (32, 0), (36, 0), (0, −12), (0, −8), (0, −4), (0, 4) and (0, 8).

For example, video encoder 200 and video decoder 300 may determine a second set of vector difference candidates (e.g., bvdCandsStep2Input) based on the first set of vector difference candidates and a second pel-interval. The second pel-interval may define a second distance between consecutive vector difference candidates in the second set of vector difference candidates, and the second pel-interval may be less than the first pel-interval. For instance, in this example, the second pel-interval is 4-pel. Therefore, there is a distance of 4-pel between candidates of the second set of vector difference candidates (e.g., there is a distance of 4-pel between (28,0) and (32,0), a distance of 4-pel between (32,0) and (36,0), and so forth).

The second set of vector difference candidates (e.g., bvdCandsStep2Input) may include at least a subset of candidates of the first set of vector difference candidates (e.g., bvdCandsStep1Input or bvdCandsStep1Output) in the second set of vector difference candidates (e.g., bvdCandsStep2Input). As one example, (0,−48) is present in both bvdCandStep1Input or bvdCandStep1Output (e.g., the first set of vector difference candidates) and in bvdCandStep2Input (e.g., the second set of vector difference candidates).

In some examples, video encoder 200 and video decoder 300 may determine respective cost values associated with candidates of the second set of vector difference candidates (e.g., cost of candidates in bvdCandStep2Input). Video encoder 200 and video decoder 300 may construct the vector difference candidate list based on the respective cost values (e.g., starting with lowest cost to highest cost).

In examples of a two-step algorithm to determine the vector difference candidate list, video encoder 200 and video decoder 300 may stop after two-steps. That is, the vector difference candidate list may be equal to bvdCandStep2Output. This two-step algorithm is described in more detail, such as where the second pel-interval is smaller, allowing for more granularity. However, in some examples, video encoder 200 and video decoder 300 may proceed with more than a two-step algorithm, and proceed to iteratively reduce the size of the pel-interval until a pel-interval threshold is reached.

Figure 15:
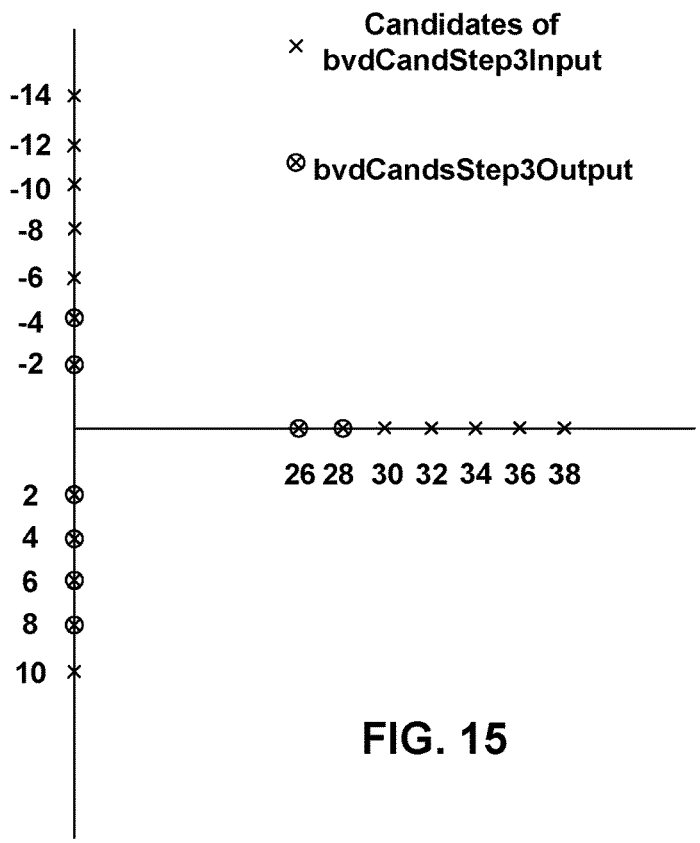
FIG. 15 is a conceptual diagram illustrating a third derivation step for the vector difference candidate list.

The following describes an example of iteratively reducing the size of the pel-interval to determine the vector difference candidate list, with steps 3 and 4. In step 3, video encoder 200 and video decoder 300 may compose a subset bvdCandsSubSetStep3Input by inserting a candidate in bvdCandsStep2Output (candStep2Output) and selecting a candidate with a distance 2-pel (S3=2) to the candStep2Output along the direction of the candStep2Output. The total number of TM is equal or smaller than N×2=8×2=16. Video encoder 200 and video decoder 300 may use TM to reorder all candidates in bvdCandsStep3Input to derive a subset bvdCandsStep3Output by selecting first N=8 candidates that has minimum TM cost. In FIG. 15, the candidates of bvdCandsStep3Input are (26, 0), (28, 0), (30, 0), (32, 0), (34, 0), (36, 0), (38, 0), (0, −14), (0, −12), (0, −10), (0, −8), (0, −6), (0, −4), (0, −2), (0, 2), (0, 4), (0, 6), (0, 8) and (0, 10). The candidates of bvdCandsStep2Output are (26, 0), (28, 0), (0, −4), (0, −2), (0, 2), (0, 4), (0, 6) and (0, 8).

Figure 16:
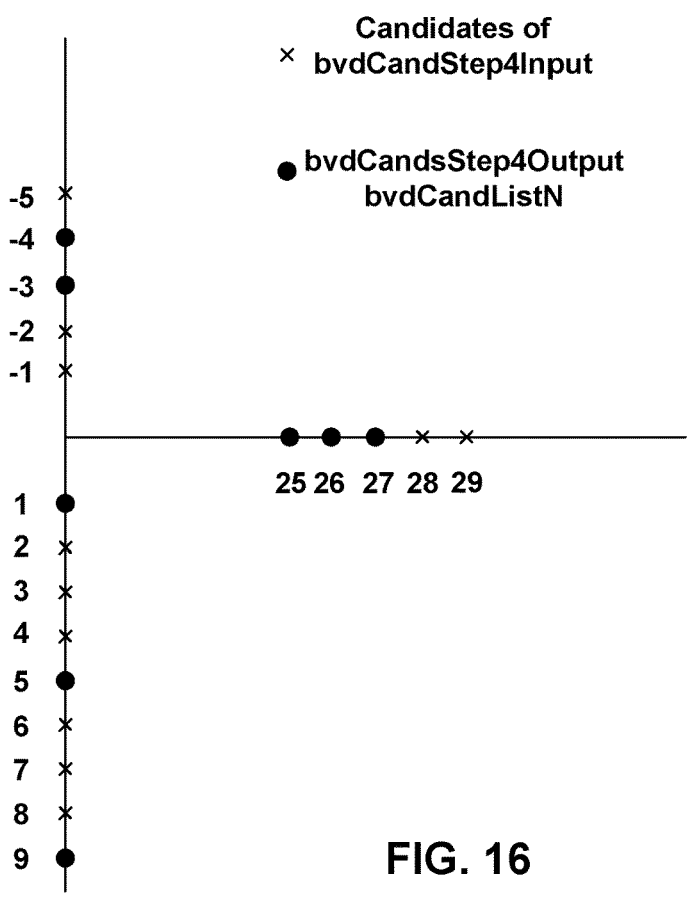
FIG. 16 is a conceptual diagram illustrating a fourth derivation step for the vector difference candidate list.

In step 4, video encoder 200 and video decoder 300 may compose a subset bvdCandsSubSetStep4Input by inserting a candidate in bvdCandsStep3Output (candStep3Output) and selecting a candidate with a distance 1-pel (S4=1) to the candStep1Output along the direction of the candStep1Output. The total number of TM is equal or smaller than N×2=8×2=16. Video encoder 200 and video decoder 300 may use TM to reorder all candidates in bvdCandsStep4Input to derive a subset bvdCandsStep4Output by selecting first N=8 candidates that has minimum TM cost. The candidates of bvdCandListN are set as candidates in bvdCandsStep4Output. In FIG. 16, the candidates of bvdCandsStep4Input are (25, 0), (26, 0), (27, 0), (28, 0), (29, 0), (0, −5), (0, −4), (0, −3), (0, −2), (0, −1), (0, 1), (0, 2), (0, 3), (0, 4), (0, 5), (0, 6), (0, 7), (0, 8) and (0, 9). The candidates of bvdCandsStep4Output (bvdCandListN) are (25, 0), (26, 0), (27, 0), (0, −4), (0, −3), (0, 1), (0, 5) and (0, 9). That is, the vector difference candidate list may include (25, 0), (26, 0), (27, 0), (0, −4), (0, −3), (0, 1), (0, 5) and (0, 9).

The following describes examples of deriving candidate list from a subset of a predefined set of BVD candidates. The example techniques may be a two-step derivation process (e.g., the two-step algorithm).

In some examples, the candidate list derivation process is similar to the method described above. For instance, the first step is same as the method described above with respect to deriving candidate list form a subset of a predefined set of BVD candidates in which bvdCandsSet is a predefined set of T1 directions, with maximum offset of T2-pel along each direction, and interval of T3-pel between each of two candidates along each direction. However, to reduce the process latency, the derivation may be performed in two steps as follows.

As step 1, video encoder 200 and video decoder 300 compose a subset bvdCandsStep1Input by selecting a candidate along each direction starting at S1-pel and ends at T2-pel, with interval of S1-pel between each two candidates, e.g. {S1-pel, 2×S1-pel, 3×S1-pel, 4×S1-pel, . . . , T2-pel}. Video encoder 200 and video decoder 300 may use TM to reorder all candidates in bvdCandsStep1Input to derive a subset bvdCandsStep1Output by selecting first N candidates that has minimum TM cost, where, T3<S1≤T2. The total number of candidates in bvdCandsStep1Input may be equal to T1×T2÷S1. In some cases where it is possible that some candidates in bvdCandsStep1Input are not valid BVD, the total number of TM is equal or smaller than T1×T2÷S1.

That is, similar to above, video encoder 200 and video decoder 300 may determine a first set of vector difference candidates (e.g., bvdCandSetup1Input) based on a first pel-interval (e.g., S1). The first pel-interval may define a first distance between consecutive vector difference candidates in the first set of vector difference candidates starting with the vector predictor. For instance, video encoder 200 and video decoder 300 may add candidates to the first set of vector difference candidates (e.g., bvdCandSetup1Input) that are each a set of positions surrounding a position of the vector predictor (e.g., BVP) and an integer multiple of the first distance away from the vector predictor (e.g., S1-pel, 2*S1-pel, 3*S1-pel, and so forth). Video encoder 200 and video decoder 300 may add candidates until a range threshold is satisfied (e.g., until T2-pel is reached) or may add candidates until a cost value associated with a candidate of the first set of vector difference candidates satisfies a cost threshold (e.g., cost value is less than or equal to cost threshold).

Video encoder 200 and video decoder 300 may determine a second set of vector difference candidates based on the first set of vector difference candidates and a second pel-interval. The second pel-interval may define a second distance between consecutive vector difference candidates in the second set of vector difference candidates, and the second pel-interval may be less than the first pel-interval. For example, video encoder 200 and video decoder 300 may determine respective cost values associated with candidates of the first set of vector difference candidates, and construct a first subset of vector difference candidates (e.g., bvdCandsStep1Output) based on the respective cost values. In this example, video encoder 200 and video decoder 300 may determine the second set of vector difference candidates based on the first subset of vector difference candidates.

As step 2, video encoder 200 and video decoder 300 may compose a subset bvdCandsSubSetStep2Input by inserting a candidate in bvdCandsStep1Output (candStep1Output) and selecting a candidate with a distance equal or smaller than S2-pel to the candStep1Output along the direction of the candStep1Output, e.g. {candStep1Output−S2, candStep1Output−(S2−1), candStep1Output−(S2−2), . . . , candStep1Output, candStep1Output+(S2+1), candStep1Output+(S2+2), . . . , candStep1Output+S2}. Video encoder 200 and video decoder 300 may use TM to reorder all candidates in bvdCandsStep2Input to derive a subset bvdCandsStep2Output by selecting first N candidates that has minimum TM cost, where, T3≤S2<S1. The total number of candidates in bvdCandsStep2Input is equal to N×(2×S2+1). In some cases where it is possible that some candidates in bvdCandsStep2Input are not valid BVD, the total number of TM is equal or smaller than N×(2×S2). The bvdCandListN is derived as the last step output subset bvdCandsStep2Output.

For example, video encoder 200 and video decoder 300 may, to determine, the second set of vector difference candidates, include at least a subset of candidates of the first set of vector difference candidates in the second set of vector difference candidates (e.g., include candidates from bvdCandStep2Output). Video encoder 200 and video decoder 300 may add candidates between the subset of candidates of the first set of vector difference candidates based on an integer multiple of the second distance. For instance, the second distance may be S2, S2−1, S2−2, S2−3.

In this example, the second pel-interval defining a second distance between consecutive vector difference candidates in the second set of vector difference candidates may be considered as 1-pel interval that defines a 1-pel distance. Approached another way, the second pel-interval may be considered as S2 that defines a second distance (e.g., S2−1, S2−2, and so forth). In some examples, video encoder 200 and video decoder 300 may add candidates between the subset of candidates until a cost value associated with a candidate of the second set of vector difference candidates satisfies a cost threshold. For instance, in these examples, the second distance is less than or equal to the second pel-interval (e.g., less than or equal to S2).

The following is an example of list derivation in two steps. In this example, bvdCandsSet is a predefined set of two horizontal and two vertical directions (T1=4), with a maximum offset is equal to be 256-pel (T2=256), and interval of 1-pel (T3=1). The total number of candidates in bvdCandsSet is equal to P=T1×T2÷T3=4×256÷1=1024.

The derivation of bvdCandListN may be as follows. As step 1, video encoder 200 and video decoder 300 may compose a subset bvdCandsStep1Input by selecting a candidate along each direction starting at 8-pel and ends at 256-pel, with interval of 8-pel (S1=8) between each two candidates. Along each direction, the candidate distance to the BVP is {8-pel, 16-pel, 24-pel, 32-pel, . . . , 248-pel, 256-pel}. The total number of TM is equal or smaller than T1×T2÷S1=4×256÷32=32. Video encoder 200 and video decoder 300 may use TM to reorder all candidates in bvdCandsStep1Input to derive a subset bvdCandsStep1Output by selecting first N=8 candidates that has minimum TM cost. The candidates of bvdCandsStep1Output are (−56, 0), (32, 0), (40, 0), (48, 0), (0, −48), (0, −8), (0, 8) and (0, 16).

For instance, video encoder 200 and video decoder 300 may determine a first set of vector difference candidates (e.g., bvdCandsStep1Input) based on a first pel-interval (e.g., 8-pel). The first pel-interval defining a first distance between consecutive vector difference candidates in the first set of vector difference candidates starting with the vector predictor. That is, the BVD for the vector predictor may be considered as (0,0), and the bvdCandStep1Input start from the vector predictor (e.g., (0,8), (0, 16), and so forth, including (8, 0) and (16, 0)) until a range threshold is satisfied (e.g., 256-pel) or a cost threshold is satisfied. For example, video encoder 200 and video decoder 300 may add candidates to the first set of vector difference candidates that are each a set of positions surrounding a position of the vector predictor and an integer multiple of the first distance away from the vector predictor (e.g., 8-pel, 2*8-pel, 3*8-pel, and so forth).

Video encoder 200 and video decoder 300 may determine respective cost values (e.g., TM cost values based on SAD of reference template around reference block pointed to by a vector and current template around current block) associated with candidates of the first set of vector difference candidates. Video encoder 200 and video decoder 300 may construct a first subset of vector difference candidates (e.g., bvdCandsStep1Output) based on the respective cost values.

As step 2, video encoder 200 and video decoder 300 may compose a subset bvdCandsSubSetStep2Input by inserting a candidate in bvdCandsStep1Output (candStep1Output) and selecting a candidate with a distance equal or smaller than 4-pel (S2=4) to the candStep1Output along the direction of the candStep1Output. The total number of TM is equal or smaller than N×(4×2)=8×(4×2)=64. Video encoder 200 and video decoder 300 may use TM to reorder all candidates in bvdCandsStep2Input to derive a subset bvdCandsStep2Output by selecting first N=8 candidates that has minimum TM cost. The candidates of bvdCandsStep2Input are (−60, 0), (−59, 0), (−58, 0), (−57, 0), (−56, 0), (−55, 0), (−54, 0), (−53, 0), (−52, 0), (28, 0), (29, 0), (30, 0), (31, 0), (32, 0), (33, 0), (34, 0), (35, 0), (36, 0), (37, 0), (38, 0), (39, 0), (40, 0), (41, 0), (42, 0), (43, 0), (44, 0), (45, 0), (46, 0), (47, 0), (48, 0), (49, 0), (50, 0), (51, 0), (52, 0), (0, −52), (0, −51), (0, −50), (0, −49), (0, −48), (0, −47), (0, −46), (0, −45), (0, −44), (0, −12), (0, −11), (0, −10), (0, −9), (0, −8), (0, −7), (0, −6), (0, −5), (0, −4), (0, 4), (0, 5), (0, 6), (0, 7), (0, 8), (0, 9), (0, 10), (0, 11), (0,12), (0, 13), (0, 14), (0, 15), (0, 16) (0, 17), (0, 18), (0, 19), and (0, 20). The candidates of bvdCandsStep2Output are (28, 0), (32, 0), (36, 0), (0, −12), (0, −8), (0, −4), (0, 4) and (0, 8). The candidate of bvdCandsStep2Output is used as the final candidate list bvdCandListN.

For example, video encoder 200 and video decoder 300 may determine a second set of vector difference candidates (e.g., bvdCandsStep2Input) based on the first set of vector difference candidates (e.g., bvdCandStep1Input or bvdCandsStep1Output, where bvdCandsStep1Output is based on bvdCandStep1Input) and a second pel-interval. As one example, video encoder 200 and video decoder 300 may determine respective cost values associated with candidates of the first set of vector difference candidates, and construct a first subset of vector difference candidates (e.g., bvdCandsStep1Output) based on the respective cost values. Video encoder 200 and video decoder 300 may determine the second set of vector difference candidates (e.g., bvdCandsStep2Output) based on the first subset of vector difference candidates (e.g., bvdCandsStep1Output).

The second pel-interval may define a second distance between consecutive vector difference candidates in the second set of vector difference candidates, and the second pel-interval may be less than the first pel-interval. For instance, in the above example, the second pel-interval may be considered as 1-pel that defines a 1-pel distance, or may be considered as 4-pel, where the second distance (e.g., 1-pel) is less than or equal to the second pel-interval (e.g., 4-pel).

Under either example, video encoder 200 and video decoder 300 may determine the second set of vector difference candidates, such as including at least a subset of candidates (e.g., bvdCandsStep1Output) of the first set of vector difference candidates in the second set of vector difference candidates, and adding candidates between the subset of candidates of the first set of vector difference candidates based on an integer multiple of the second distance (e.g., 1-pel, 2*1-pel, 3*1-pel, and so forth). In some examples, the distances may be fractional pel. Video encoder 200 and video decoder 300 may add candidates to the second set of vector difference candidates until a cost value associated with a candidate of the second set of vector difference candidates satisfies a cost threshold.

The above example techniques may be used for motion vector as well. For instance, video encoder 200 and video decoder 300 may utilize the above example techniques for inter MMVD candidate list. Depending on the decided Adaptive Motion Vector Resolution (AMVR) parameter of the current block, the maximum offset T2, minimum interval T3 and S(x) are determined accordingly.

In one example, when AMVR set to be quarter-pel resolution, T3 is set to be fractional pel, e.g. ¼-pel, T2 is set to be 8-pel and S(x) is start from 1-pel reduce to ¼-pel. In one example, when AMVR set to be half-pel resolution, T3 is set to be ½-pel, T2 is set to be 16-pel and S(x) is start from 2-pel reduce to ½-pel. In one example, when AMVR set to be one-pel resolution, T3 is set to be 1-pel, T2 is set to be 32-pel and S(x) is start from 4-pel reduce to 1-pel. In one example, when AMVR set to be four-pel resolution, T3 is set to be 4-pel, T2 is set to be 128-pel and S(x) is start from 8-pel reduce to 4-pel.

Figure 18:
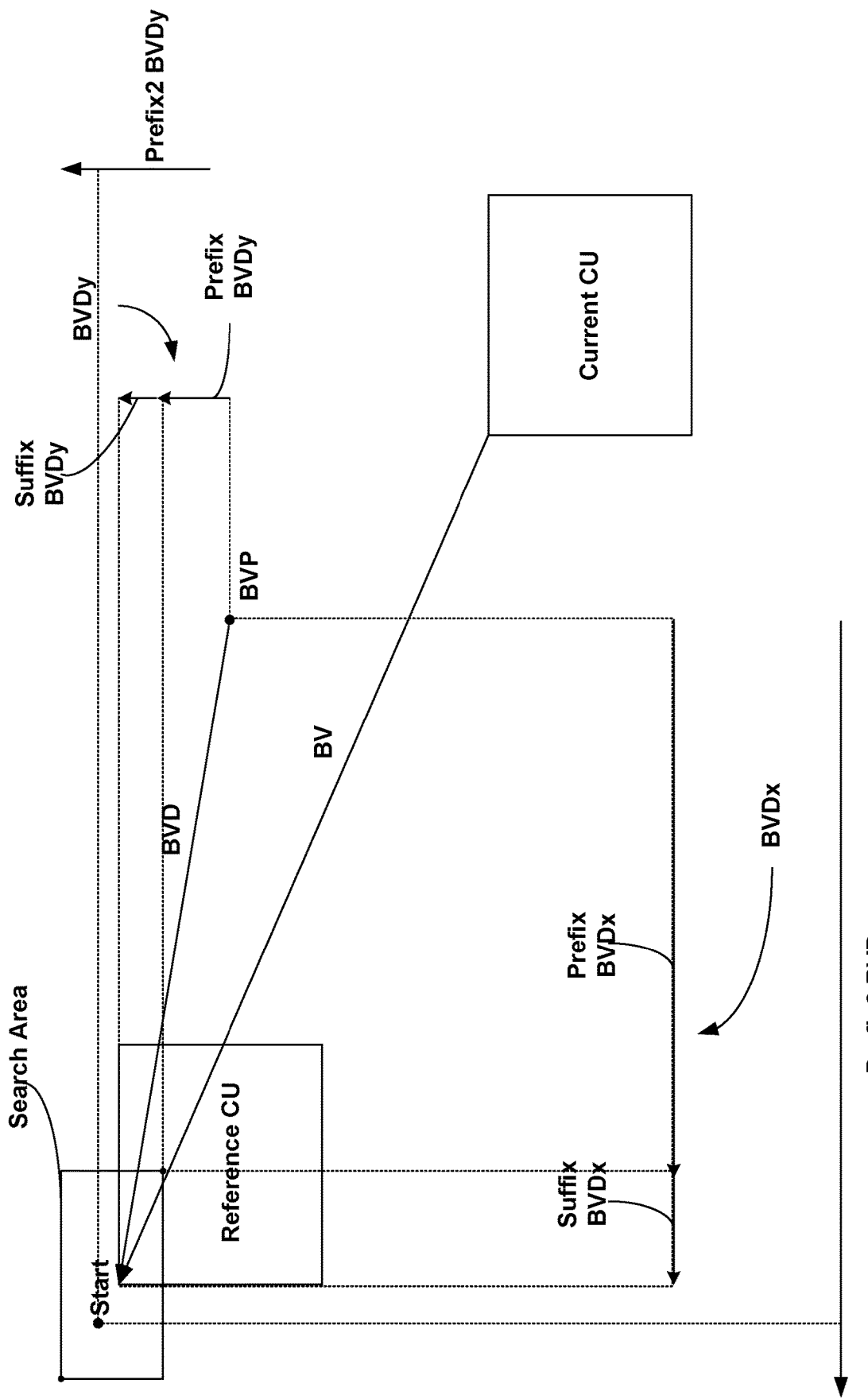
FIG. 18 is a conceptual diagram illustrating another example of the AMVP process with template search starting from prefix vector.

The following describes examples of IBC AMVP BVD signaling improvement. FIG. 18 is a conceptual diagram illustrating another example of the AMVP process with template search starting from prefix vector. In FIG. 18, and the following, one or more examples are described to derive a suffix BVD for IBC AMVP mode, for instance with template search around prefix vector with one validation flag. For coding as part of the AMVP, Table 2 includes some example values.

TABLE 2

| | BVD value | | | | | | |
|---|---|---|---|---|---|---|---|
| | 0-1 | 2-5 | 6-13 | 14-29 | 30-61 | 62-125 | 126-253 |
| Prefix | 0 | 2 | 6 | 14 | 30 | 62 | 126 |
| validation | 0/1 | 0/1 | 0/1 | 0/1 | 0/1 | 0/1 | 0/1 |
| Suffix bins | 1/0 | 2/0 | 3/0 | 4/0 | 5/0 | 6/0 | 7/0 |
| Suffix values | 0-1 | 0-3 | 0-7 | 0-15 | 0-31 | 0-63 | 0-127 |

In one or more examples, the BvdTplValiadationFlag may be indicating whether the suffixBVD is signaled or derived using template-based search. Video encoder 200 may signal and video decoder 300 may parse prefixBvd from the bitstream. In one or more examples, video encoder 200 and video decoder 300 may derive the search area by finding nextPrefixBVD=prefixBVD+maxPossibleSuffix(prefixBVD)+1. The search area is from prefixBVDx to nextPrefixBVDx horizontally and from prefixBVDy to nextPrefixBVDy vertically.

In some examples, video encoder 200 and video decoder 300 may perform the search in a way where every candidate in the search area is tested. In total, there may be totalNumberOfCandidates=(nextPrefixBVDx−prefixBVDx)*(nextPrefixBVDy−prefixBVDy). The list of all tested candidates are sorted and the one candidate with the best cost is selected. From the best candidate position, video encoder 200 and video decoder 300 may derive BVD=prefixBVD+bvdTplSearchCand0.

If the BvdTplValiadationFlag is equal to zero, video encoder 200 may signal and video decoder 300 may parse the suffixBVD from the bitstream and BVD=prefixBVD+suffixBVD.

The following describes template search using subset of search area around prefix vector with one validation flag and candidate index signaling. In this example, the search area may be restricted to the Nh*Nv possible positions, those numbers (e.g., values for Nh and Nv) may depend on the value of prefixBVDx and prefixBVDy respectively. The distance between horizontal positions d(x, x+1)=(nextPrefixBVDx−prefixBVDx)/Nh, and the distance between vertical positions d(y, y+1)=(nextPrefixBVDy−prefixBVDy)/Nv.

Video encoder 200 and video decoder 300 may select the N lowest TM cost suffixBVD candidates and put into a list ordered by TM cost. Video encoder 200 may signal and video decoder 300 may receive the candidate index in the bitstream to indicate which suffixBVD is used.

When N is equal to 1, the suffixBVD is derived as the lowest TM cost suffixBVD candidates in the determined search area.

The following describes template search around prefix vector with one validation flag and candidate index signaling. For coding, Table 3 includes some example values.

TABLE 3

| | BVD value | | | | | | |
| --- | --- | --- | --- | --- | --- | --- | --- |
| | 0-1 | 2-5 | 6-13 | 14-29 | 30-61 | 62-125 | 126-253 |
| Prefix | 0 | 2 | 6 | 14 | 30 | 62 | 126 |
| validation | 0/1x | 0/1x | 0/1x | 0/1x | 0/1x | 0/1x | 0/1x |
| Suffix bins | 1/x | 2/x | 3/x | 4/x | 5/x | 6/x | 7/x |
| Suffix values | 0-1 | 0-3 | 0-7 | 0-15 | 0-31 | 0-63 | 0-127 |

In this example, the process of deriving search area and tested candidates are the same as described above with respect to template search around prefix vector with one validation flag. One difference may be that video encoder 200 may signal and video decoder 300 may parse the bvdTplSearchCandIdx from the bitstream.

Video encoder 200 and video decoder 300 may select the N lowest TM cost suffixBVD candidates and put into a list ordered by TM cost. Video encoder 200 may signal and video decoder 300 may parse the candidate index bvdTplSearchCandIdx in the bitstream to indicate which suffixBVD is used.

When N is equal to 1, the suffixBVD is derived as the lowest TM cost suffixBVD candidates in the determined search area.

In some examples, after sorting the candidate list, video encoder 200 and video decoder 300 may use the candidate with bvdTplSearchCandIdx for BVD derivation. BVD=prefixBVD+bvdTplSearchCand[bvdTplSearchCandIdx]. The maximum value of the bvdTplSearchCandIdx is predefined and controlled by maxNumberOfTplCands.

The following describes an example of BVD suffix search. As step 1, PrefixBVD is parsed from the bitstream prefixBVD={−14, 62}. As step 2, validation flag is parsed BvdTplValiadationFlag=True. As step 3, the nextPrefixBVD is derived={−30, 126}

As step 4, there may be 1-Pel search as follows.
For x=−14 to x=−30
For y=62 to y=126
 tplCandList.addCandAt(x, y)

As step 5, video encoder 200 and video decoder 300 may sort the list tplCandList by cost value and take the best candidate bvdTplSearchCand0={−4,3}. As step 6, BVD is decoded=prefixBVD+bvdTplSearchCand0={−18, 65}.

The following is an example of BVD suffix search with N=1 candidates with lowest cost. As step 1, video encoder 200 may signal and video decoder 300 may parse PrefixBVD from the bitstream prefixBVD={2, 6}. As step 2, video encoder 200 may signal and video decoder 300 may parse validation flag BvdTplValiadationFlag=True As step 3, maxNumberOfTplCands is set to 1, and no parsing of bvdTplSearchCandIdx may be required and bvdTplSearchCandIdx=0. As step 4, the nextPrefixBVD is derived={6,14}

As step 5, there may be 1-Pel search as follows.
For x=2 to x=6
For y=6 to y=14
 tplCandList.addCandAt(x, y)

As step 6, video encoder 200 and video decoder 300 may sort the list tplCandList by cost value and take the best candidate bvdTplSearchCand[bvdTplSearchCandIdx=0]={1,0}. As step 7, BVD is decoded=prefixBVD+bvdTplSearchCand0={3, 6}.

The following is an example of BVD suffix search with N=5 candidates with lowest cost. As step 1, video encoder 200 may signal and video decoder 300 may parse PrefixBVD from the bitstream prefixBVD={2, 2}. As step 2, video encoder 200 may signal and video decoder 300 may parse validation flag BvdTplValiadationFlag=True As step 3, maxNumberOfTplCands is set to 5. As step 4, video encoder 200 may signal and video decoder 300 may parse of bvdTplSearchCandIdx=2. As step 5, the nextPrefixBVD is derived={6,6}.

As step 6, there may be 1-Pel search as follows.
For x=2 to x=6
For y=2 to y=6
 tplCandList.addCandAt(x, y)

As step 7, video encoder 200 and video decoder 300 may sort the list tplCandList by cost value sortedTplCandList= [{0,1}, {1,0}, {2,2}, {1,1}, {0,0}, {1,2}, {2,1}, {3,1}, {3,2}, {2,3}, {3,0}, {0,3}, {0,2}, {2,0}, {3,3}, {1,3}]. As step 8, bvdTplSearchCand=sortedTplCandList[bvdTplSearchCandIdx]=sortedTplCandList[2]={2,2}. As step 9: BVD is decoded=prefixBVD+bvdTplSearchCand={4, 4}.

Figure 2:
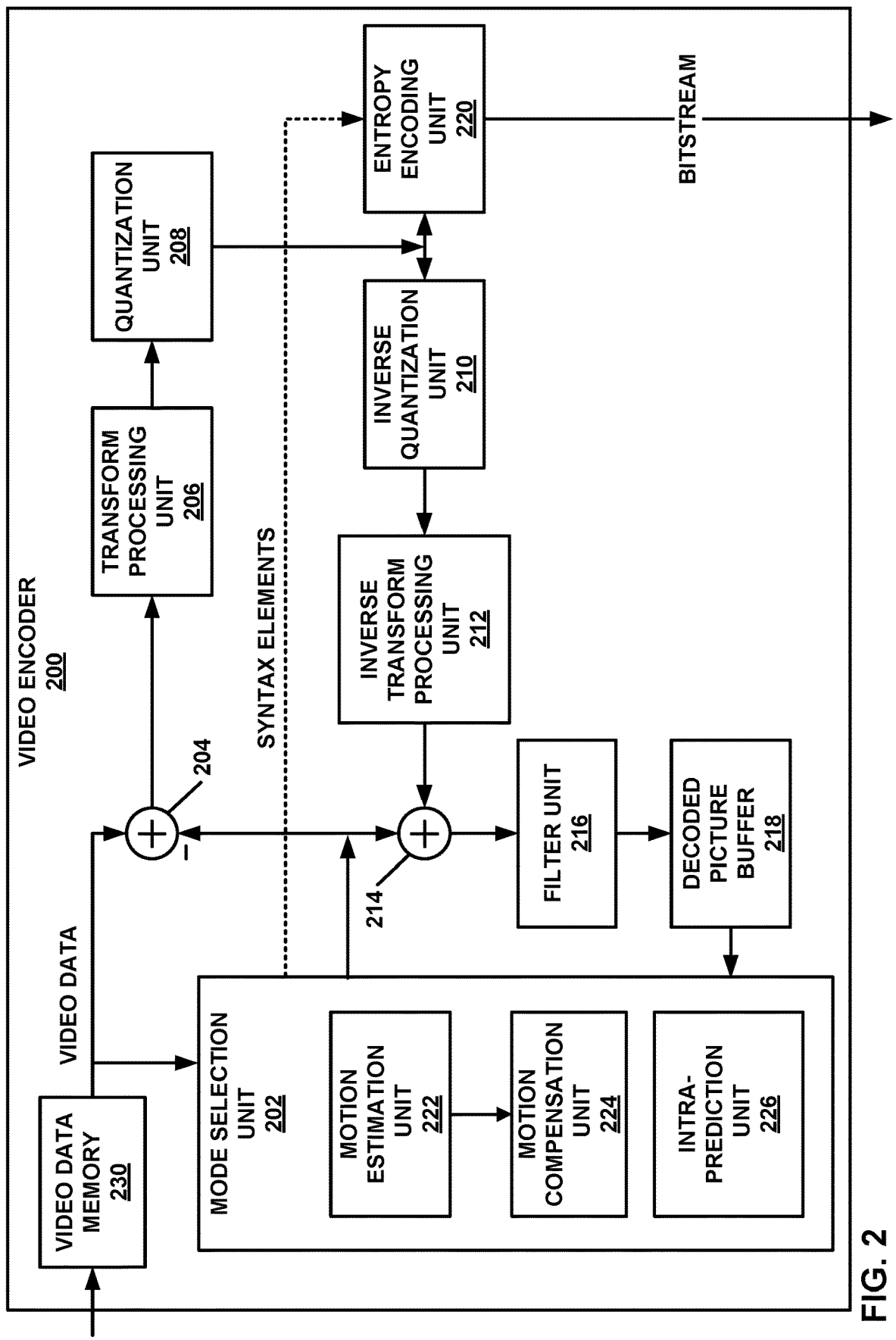
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a vector predictor for a current block, determine a set of vector difference candidates, construct a vector difference candidate list based on the set of vector difference candidates, determine a vector for the current block, determine a vector difference based on the vector predictor and the vector for the current block, and signal an index into the vector difference candidate list that identifies the vector difference.

Figure 3:
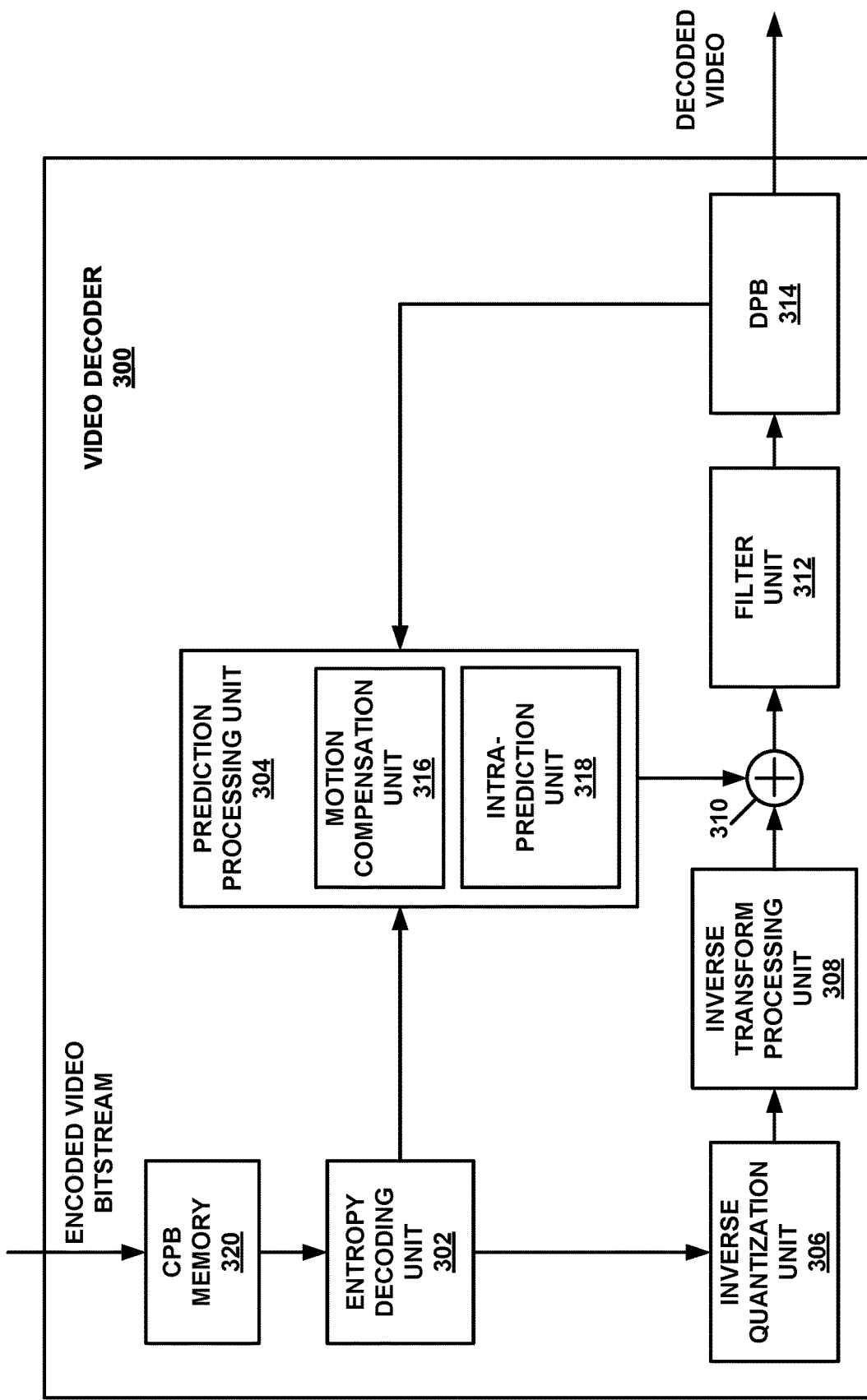
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a vector predictor for a current block, determine a set of vector difference candidates, construct a vector difference candidate list based on the set of vector difference candidates, determine a vector for the current block based on the vector predictor and a vector difference from the vector difference candidate list, and reconstruct the current block based on the vector for the current block.

Figure 4:
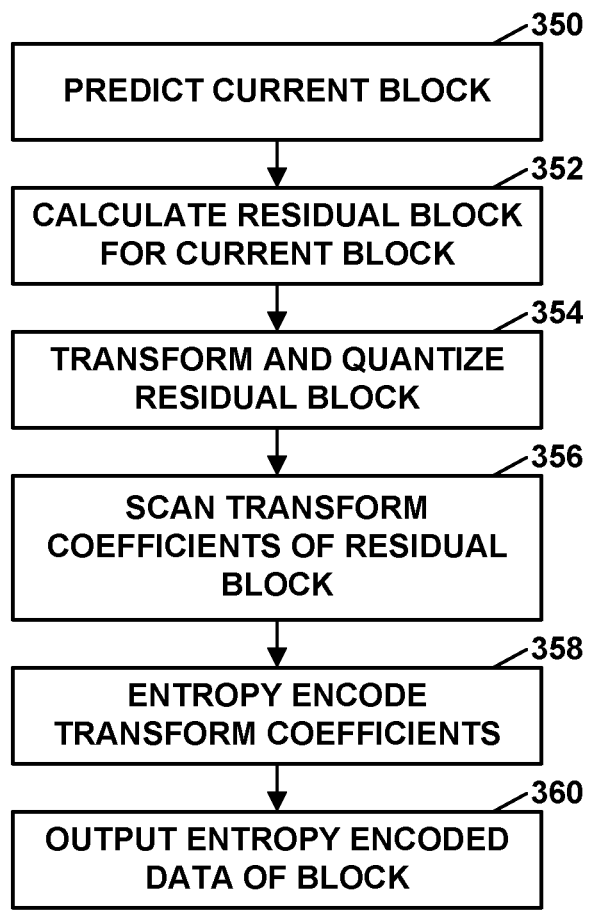
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
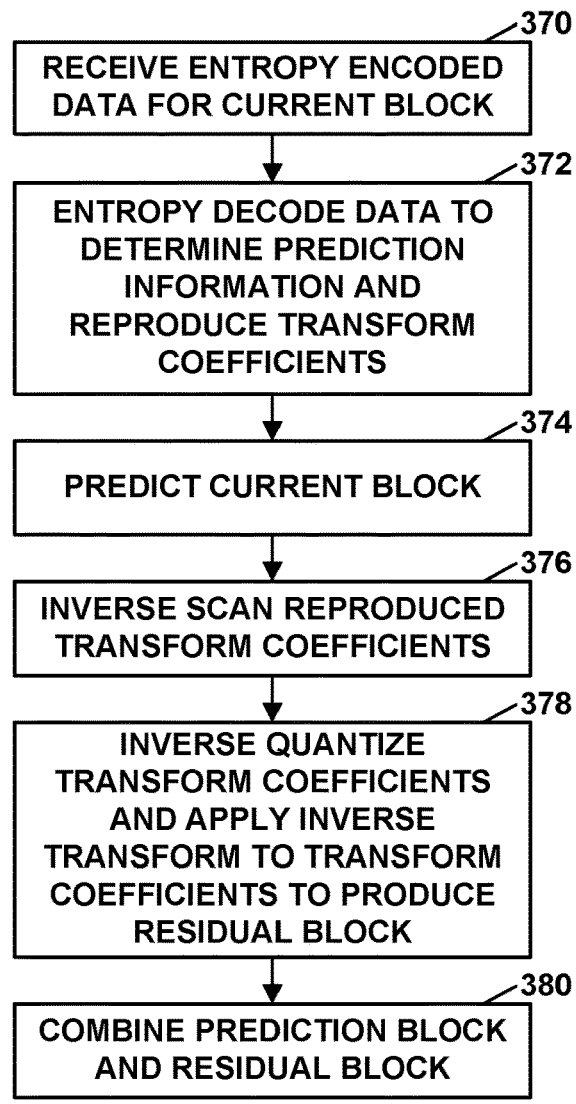
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 19:
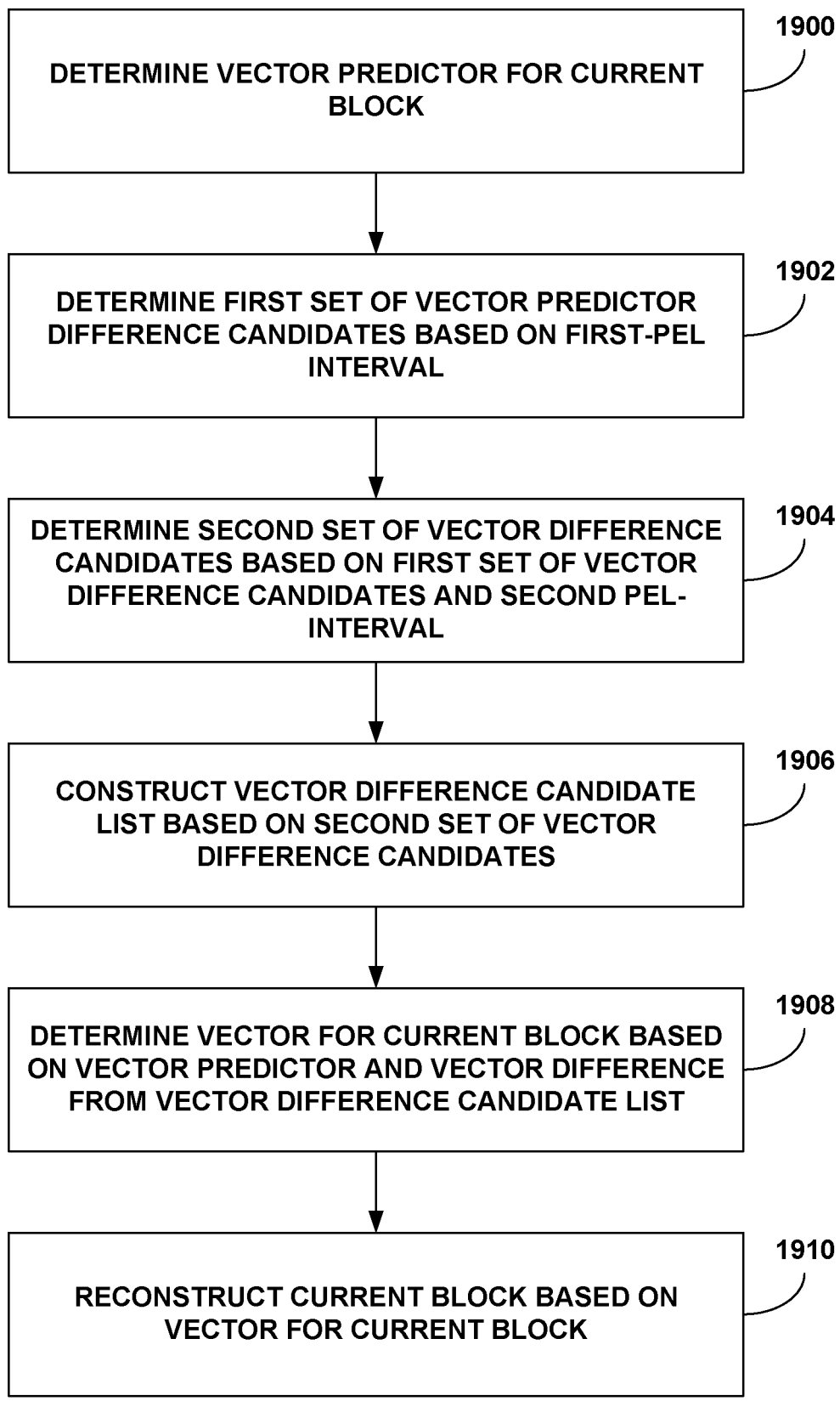
FIG. 19 is a flowchart illustrating another example method for decoding a current block in accordance with the techniques of this disclosure.

FIG. 19 is a flowchart illustrating another example method for decoding a current block in accordance with the techniques of this disclosure. The example of FIG. 19 is described with respect to processing circuitry of video decoder 300. For example, one or more memories (e.g., memory 120, CPB memory 320, DPB 314, or some other memory) may be configured to store video data. The processing circuitry of video decoder 300 may be coupled to the one or more memories.

The processing circuitry of video decoder 300 may be configured to determine a vector predictor for a current block of the video data (1900). For example, video encoder 200 may signal information that video decoder 300 uses to determine the vector predictor (e.g., such as vector of neighboring block).

The processing circuitry of video decoder 300 may be configured to determine a first set of vector difference candidates based on a first pel-interval (1902). The first pel-interval may define a first distance between consecutive vector difference candidates in the first set of vector difference candidates starting with the vector predictor. For example, the first set of vector difference candidates may be bvdCandsStep1Input described above, and the first pel-interval may be 8-pel or a different interval, including fractional interval. As one example, the processing circuitry of video decoder 300 may add candidates to the first set of vector difference candidates that are each a set of positions surrounding a position of the vector predictor and an integer multiple of the first distance away from the vector predictor. The processing circuitry of video decoder 300 may add candidates until a range threshold is satisfied and/or until a cost value associated with a candidate of the first set of vector difference candidates satisfies a cost threshold.

The processing circuitry of video decoder 300 may determine a second set of vector difference candidates based on the first set of vector difference candidates and a second pel-interval (1904). The second pel-interval may define a second distance between consecutive vector difference candidates in the second set of vector difference candidates, and the second pel-interval may be less than the first pel-interval.

For example, the second set of vector difference candidates may be bvdCandsStep2Input or bvdCandsSubSetStep2Input described above, and the second pel-interval may be 4-pel, 1-pel, or a different interval, including fractional interval. The processing circuitry of video decoder 300 may determine respective cost values (e.g., TM cost based on SAD) associated with candidates of the first set of vector difference candidates, and construct a first subset of vector difference candidates (e.g., bvdCandsStep1Output) based on the respective cost values. The processing circuitry of video decoder 300 may determine the second set of vector difference candidates (e.g., bvdCandsStep2Input or bvdCandsSubSetStep2Input) based on the first subset of vector difference candidates (e.g., bvdCandsStep1Output).

As one example, the processing circuitry of video decoder 300 may include at least a subset of candidates of the first set of vector difference candidates in the second set of vector difference candidates. For instance, bvdCandsStep2Input or bvdCandsSubSetStep2Input includes one or more candidates from bvdCandsStep1Output or bvdCandsStep1 Input). The processing circuitry may add candidates between the subset of candidates of the first set of vector difference candidates based on an integer multiple of the second distance. In some examples, the second distance is less than or equal to the second pel-interval. As one example, the processing circuitry of video decoder 300 may add candidates to the second set of vector difference candidates until a cost value associated with a candidate of the second set of vector difference candidates satisfies a cost threshold.

The processing circuitry of video decoder 300 may construct a vector difference candidate list (e.g., bvdCandListN) based on the second set of vector difference candidates (1906). For example, the processing circuitry of video decoder 300 may determine respective cost values associated with candidates of the second set of vector difference candidates (e.g., cost values for candidates in bvdCandsStep2Output). The processing circuitry of video decoder 300 may construct the vector difference candidate list (e.g., bvdCandListN) based on the respective cost values. For instance, the processing circuitry of video decoder 300 may select the N candidates having the lowest cost values and may optionally arrange the N candidates from lowest to highest cost.

The processing circuitry of video decoder 300 may determine a vector for the current block based on the vector predictor and a vector difference from the vector difference candidate list (1908). For example, video decoder 300 may receive an index into the vector difference candidate list that identifies a vector difference. Video decoder 300 may add the vector difference to the vector predictor to determine the vector for the current block.

The processing circuitry of video decoder 300 may reconstruct the current block based on the vector for the current block (1910). For example, the processing circuitry of video decoder 300 may generate a prediction signal based on the vector for the current block, and receive residual information from video encoder 200. The processing circuitry of video decoder 300 may add the prediction signal and the residual information to reconstruct the current block.

In the example of FIG. 19, the current block may be encoded in intra block-copy (IBC) merge mode with block vector differences (IBC-MBVD). The vector predictor may be a block vector predictor (BVP), and the vector difference candidate list may be a block vector difference (BVD) candidate list.

Figure 20:
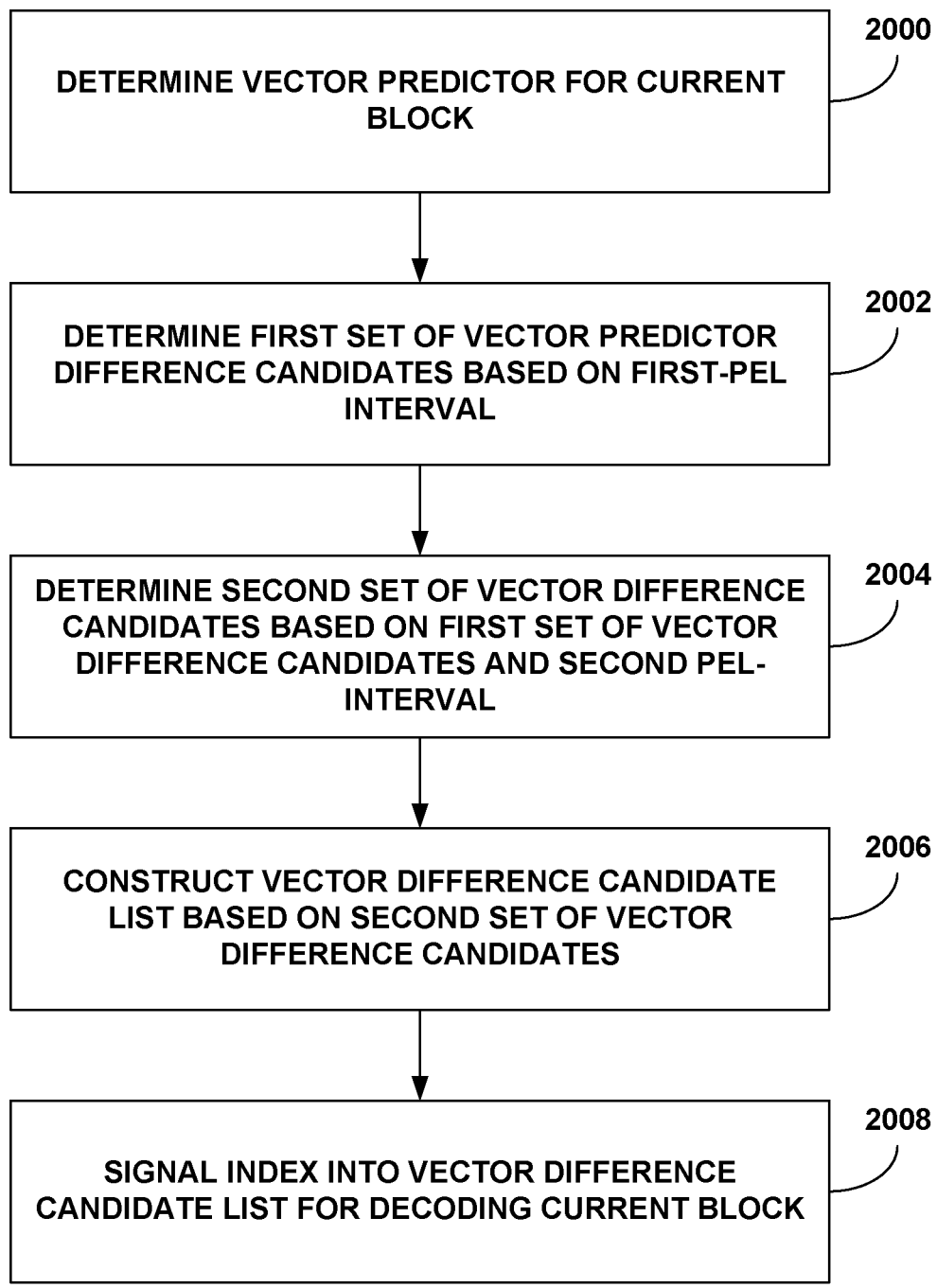
FIG. 20 is a flowchart illustrating another example method for encoding a current block in accordance with the techniques of this disclosure.

FIG. 20 is a flowchart illustrating another example method for encoding a current block in accordance with the techniques of this disclosure. The example of FIG. 20 is described with respect to processing circuitry of video encoder 200. For example, one or more memories (e.g., memory 106, video data memory 230, decoded picture buffer 218, or some other memory) may be configured to store video data. The processing circuitry of video encoder 200 may be coupled to the one or more memories.

Using similar techniques to those described above for video decoder 300, the processing circuitry of video encoder 200 may determine a vector predictor for a current block of the video data (2000), determine a first set of vector difference candidates based on a first pel-interval (2002), the first pel-interval defining a first distance between consecutive vector difference candidates in the first set of vector difference candidates starting with the vector predictor, determining a second set of vector difference candidates based on the first set of vector difference candidates and a second pel-interval (2004), the second pel-interval defining a second distance between consecutive vector difference candidates in the second set of vector difference candidates, and the second pel-interval being less than the first pel-interval, and construct a vector difference candidate list based on the second set of vector difference candidates (2006). In FIG. 20, the processing circuitry of video encoder 200 may be configured to signal an index into the vector difference candidate list for decoding the current block (2008). The processing circuitry of video encoder 200 may also signal residual information indicative of a difference between the current block and a prediction signal.

Figure 21:
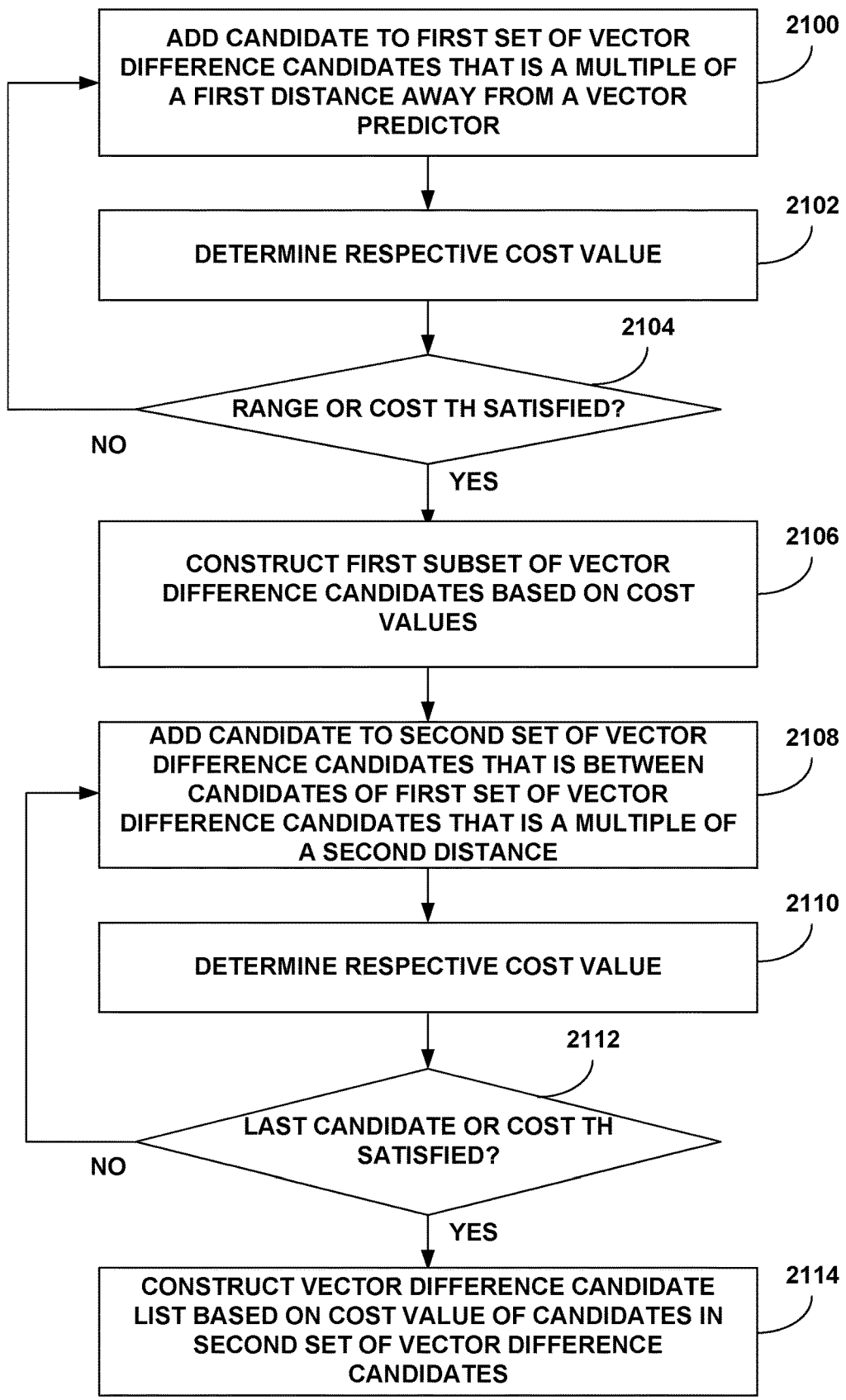
FIG. 21 is a flowchart illustrating an example method of constructing a vector difference candidate list.

FIG. 21 is a flowchart illustrating an example method of constructing a vector difference candidate list. The example of FIG. 21 illustrates a two-step algorithm (e.g., derivation process) for constructing the vector difference candidate list. Video encoder 200 and video decoder 300 may be configured to perform the same techniques. The example of FIG. 21 is described with respect to processing circuitry, which may be processing circuitry of video encoder 200 or video decoder 300.

The processing circuitry may add a candidate to a first set of vector difference candidates (e.g., bvdCandsStep1Input) that is a multiple of a first distance away from a vector predictor (2100). For example, if the first distance is defined by a first pel-interval (e.g., S1), then the candidates may be S1, 2*S1, 3*S1, and so forth.

The processing circuitry may determine respective cost value for the candidate (2102). For instance, the processing circuitry may determine a TM cost based on SAD values between a reference template above and left of a reference block pointed to by the vector predictor added to the candidate and a current template above and left of the current block. In some examples, the processing circuitry may first add all candidates to the first set of vector difference candidates, and then determine respective cost values.

The processing circuitry may determine whether a range threshold or cost threshold is satisfied (2104). For instance, the processing circuitry may determine whether the last candidate is evaluated or whether a cost of a candidate is below a threshold. If the range threshold or cost threshold is not satisfied (NO of 2104), the processing circuitry may add another candidate to a first set of vector difference candidates (2100).

If the range threshold or cost threshold is satisfied (YES of 2104), the processing circuitry may construct first subset of vector difference candidates based on cost values (2106). One examples of the first subset of vector difference candidates is bvdCandsStep1Output.

The processing circuitry may add a candidate to a second set of vector difference candidates (e.g., bvdCandsSubSetStep2Input) that is between candidates of first set of vector difference candidates that is a multiple of a second distance (2108). For example, if the second distance is defined by a second pel-interval (e.g., S2), then the candidates may be {candStep1Output−S2, candStep1Output−(S2−1), candStep1Output−(S2−2), . . . , candStep1Output, candStep1Output+(S2+1), candStep1Output+(S2+2), . . . , candStep1Output+S2}, where candStep1Output are candidates of the first set of vector difference candidates.

The processing circuitry may determine respective cost value for the candidate (2110). For instance, the processing circuitry may determine a TM cost based on SAD values between a reference template above and left of a reference block pointed to by the vector predictor added to the candidate and a current template above and left of the current block. In some examples, the processing circuitry may first add all candidates to the second set of vector difference candidates, and then determine respective cost values.

The processing circuitry may determine whether last candidate is evaluated or whether cost threshold is satisfied (2112). If the last candidate is not evaluated or cost threshold is not satisfied (NO of 2112), the processing circuitry may add another candidate to a second set of vector difference candidates (2108).

If the last candidate is evaluated or the cost threshold is satisfied (YES of 2112), the processing circuitry may construct a vector difference candidate list (e.g., bvdCandListN) based on cost values of candidates in the second set of vector difference candidates (e.g., bvdCandsSubSetStep2Input) (2114). For example, the processing circuitry may determine the N candidates in bvdCandsSubSetStep2Input having the lowest cost and arrange the N candidates from lowest to highest cost, the result may be the vector difference candidate list.

Figure 22:
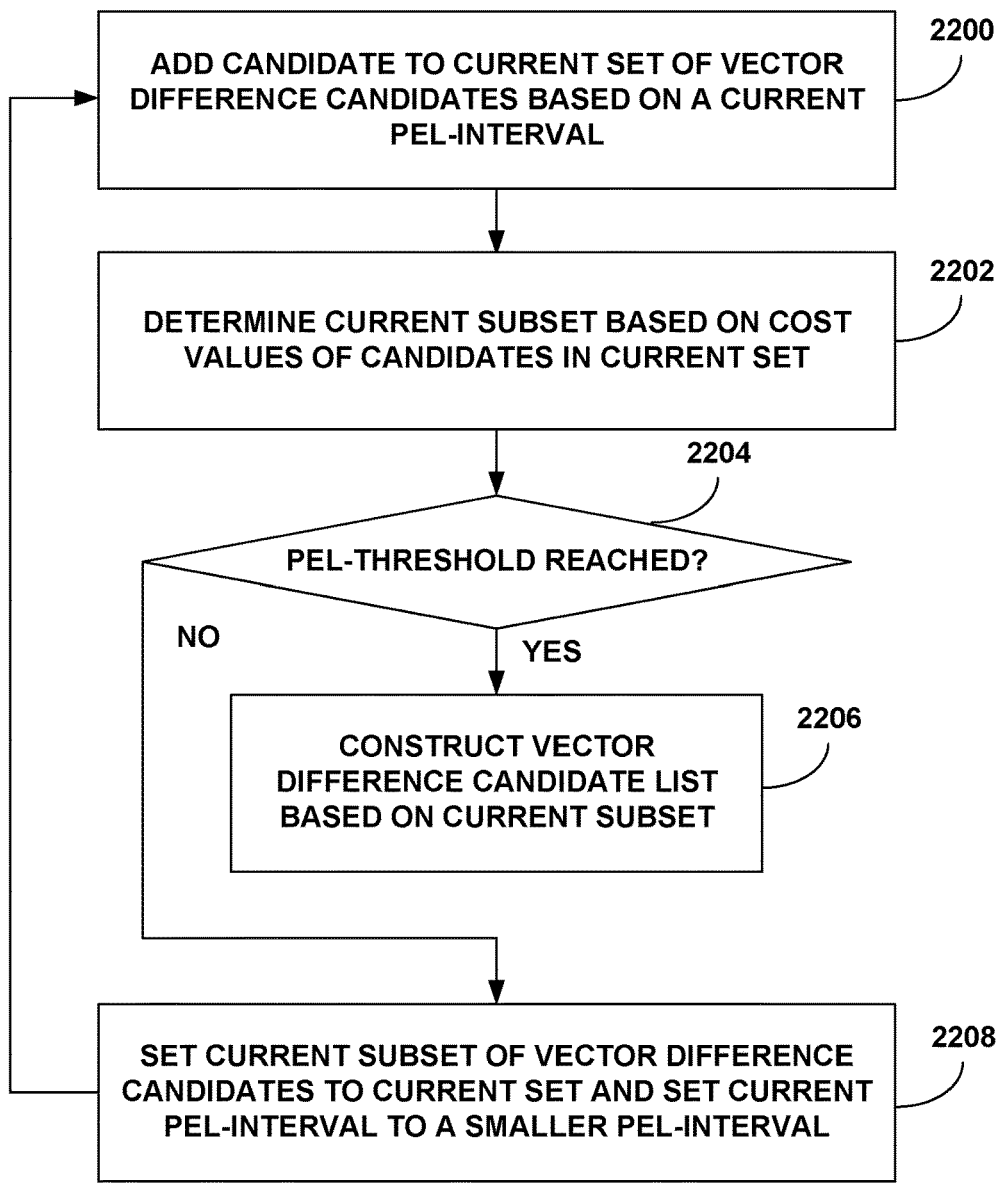
FIG. 22 is a flowchart illustrating another example method of constructing a vector difference candidate list.

FIG. 22 is a flowchart illustrating another example method of constructing a vector difference candidate list. The example of FIG. 22 illustrates an iterative algorithm (e.g., derivation process) for constructing the vector difference candidate list. Video encoder 200 and video decoder 300 may be configured to perform the same techniques. The example of FIG. 22 is described with respect to processing circuitry, which may be processing circuitry of video encoder 200 or video decoder 300.

The processing circuitry may add a candidate to a current set of vector difference candidates based on a current pel-interval (2200). For example, the processing circuitry may add candidates that are 8-pel, 12-pel, 16-pel, and so forth, where the current pel-interval is 8.

The processing circuitry may determine a current subset based on cost values of candidates in the current set (2202). For instance, the processing circuitry may select the X number of candidates having the lowest cost.

The processing circuitry may determine whether a pel-threshold is reached (2204). For instance, assume that the pel-threshold is 2-pel in this example. Since the current pel-interval is 8-pel, the processing circuitry may determine that the pel-threshold is not reached (NO of 2204).

The processing circuitry may set the current set of subset of vector difference candidates to the current set of vector difference candidates and set the current pel-interval to a smaller pel-interval (e.g., 4-pel) (2208). The processing circuitry may then repeat the operations illustrated in FIG. 22 until the pel-threshold is reached (YES of 2204). The processing circuitry may construct the vector difference candidate list based on the current subset (e.g., X number of candidates having the lowest cost).

The following numbered clauses illustrate one or more aspects of the devices and techniques described in this disclosure.

Clause 1. A method of decoding video data, the method comprising: determining a vector predictor for a current block; determining a set of vector difference candidates; constructing a vector difference candidate list based on the set of vector difference candidates; determining a vector for the current block based on the vector predictor and a vector difference from the vector difference candidate list; and reconstructing the current block based on the vector for the current block.

Clause 2. A method of encoding video data, the method comprising: determining a vector predictor for a current block; determining a set of vector difference candidates; constructing a vector difference candidate list based on the set of vector difference candidates; determining a vector for the current block; determining a vector difference based on the vector predictor and the vector for the current block; and signaling an index into the vector difference candidate list that identifies the vector difference.

Clause 3. The method of any of clauses 1 and 2, wherein the vector predictor is one of a block vector predictor or a motion vector predictor, wherein the set of vector difference candidates is one of a set of block vector difference candidates or a set of motion vector difference candidates, wherein the vector difference candidate list is one of a block vector difference candidate list or a motion vector difference candidate list, and wherein the vector for the current block is one of a block vector or a motion vector for the current block.

Clause 4. The method of any of clauses 1-3, wherein determining the set of vector difference candidates comprises determining the set of vector difference candidates based on a set of positions surrounding a position of the vector predictor.

Clause 5. The method of clause 4, wherein the set of positions includes all positions surrounding the position of the vector predictor or less than all positions surrounding the position of the vector predictor.

Clause 6. The method of any of clauses 1-5, further comprising: determining a subset of vector difference candidates from the set of vector difference candidates, wherein constructing the vector difference candidate list comprises constructing the vector difference candidate list based on the subset of vector difference candidates.

Clause 7. The method of any of clauses 1-6, wherein constructing the vector difference candidate list comprises: determining a first subset of the set of vector difference candidates based on one of selection of candidates along each direction with different pels or selection of candidates along each direction with different pels and reordering; and repeatedly determining one or more additional subsets of vector difference candidates by adding candidates at different pel distances based on a previous subset of the set of vector difference candidates, wherein a final subset of vector difference candidates from additional subsets is the vector difference candidate list.

Clause 8. The method of any of clauses 1-7, further comprising: determining that a vector difference candidate in the vector difference candidate list is valid based on one or more of: determining that the vector difference candidate when summed with the vector predictor results in a hypothetical vector within a search range; in a condition where the vector predictor is derived from a neighbor block, and the neighbor block is coded with horizontal flip type, the vector difference candidate has a vertical component value that is equal to 0; in a condition where the vector predictor is derived from a neighbor block, and the neighbor block is coded with vertical flip type, the vector difference candidate has a horizontal component value that is equal to 0; in a condition where the current block is coded with horizontal flip type, the vector difference candidate has a vertical component value that is equal to 0; and in a condition where the current block is coded with vertical flip type, the vector difference candidate has a horizontal component value that is equal to 0.

Clause 9. The method of any of clauses 1-8, further comprising: determining a threshold size for the set of vector difference candidates based on block size of the current block, wherein determining the set of vector difference candidates comprises determining the set of vector difference candidates until a number of vector difference candidates is equal to the threshold size.

Clause 10. A device for decoding video data, the device comprising: memory configured to store the video data; and processing circuitry configured to perform the method of any of clauses 1 and 3-9.

Clause 11. The device of clause 10, further comprising a display configured to display decoded video data.

Clause 12. The device of any of clauses 10 and 11, wherein the device comprises a video decoder or a video encoder.

Clause 13. A device for encoding video data, the device comprising: memory configured to store the video data; and processing circuitry configured to perform the method of any of clauses 2-9.

Clause 14. The device of clause 13, wherein the device comprises a video encoder.

Clause 15. The device of any of clauses 10-13, wherein the device comprises one or more of a camera, a computer, a mobile device, a broadcast receiver device, or a set-top box.

Clause 16. A computer-readable storage medium having stored thereon instructions that, when executed, cause one or more processors to perform the method of any of clauses 1 and 3-9.

Clause 17. A computer-readable storage medium having stored thereon instructions that, when executed, cause one or more processors to perform the method of any of clauses 2-9.

Clause 18. A device for decoding video data, the device comprising means for performing the method of any of clauses 1 and 3-9.

Clause 19. A device for decoding video data, the device comprising means for performing the method of any of clauses 2-9.

Clause 1A. A method of decoding video data, the method comprising: determining a vector predictor for a current block of the video data; determining a first set of vector difference candidates based on a first pel-interval, the first pel-interval defining a first distance between consecutive vector difference candidates in the first set of vector difference candidates starting with the vector predictor; determining a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; constructing a vector difference candidate list based on the second set of vector difference candidates; determining a vector for the current block based on the vector predictor and a vector difference from the vector difference candidate list; and reconstructing the current block based on the vector for the current block.

Clause 2A. The method of clause 1A, wherein determining the first set of vector difference candidates comprises: adding candidates to the first set of vector difference candidates that are each a set of positions surrounding a position of the vector predictor and an integer multiple of the first distance away from the vector predictor.

Clause 3A. The method of clause 2A, wherein adding candidates comprises adding candidates until a range threshold is satisfied.

Clause 4A. The method of any of clauses 2A and 3A, wherein adding candidates comprises adding candidates until a cost value associated with a candidate of the first set of vector difference candidates satisfies a cost threshold.

Clause 5A. The method of any of clauses 1A-4A, wherein determining the second set of vector difference candidates comprises: including at least a subset of candidates of the first set of vector difference candidates in the second set of vector difference candidates; and adding candidates between the subset of candidates of the first set of vector difference candidates based on an integer multiple of the second distance.

Clause 6A. The method of clause 5A, wherein adding candidates between the subset of candidates comprises adding candidates to the second set of vector difference candidates until a cost value associated with a candidate of the second set of vector difference candidates satisfies a cost threshold.

Clause 7A. The method of any of clauses 1A-6A, further comprising: determining respective cost values associated with candidates of the first set of vector difference candidates; and constructing a first subset of vector difference candidates based on the respective cost values, wherein determining the second set of vector difference candidates comprises determining the second set of vector difference candidates based on the first subset of vector difference candidates.

Clause 8A. The method of any of clauses 1A-7A, further comprising: determining respective cost values associated with candidates of the second set of vector difference candidates, wherein constructing the vector difference candidate list comprises constructing the vector difference candidate list based on the respective cost values.

Clause 9A. The method of any of clauses 1A-8A, wherein the current block is encoded in intra block-copy (IBC) merge mode with block vector differences (IBC-MBVD), wherein the vector predictor is a block vector predictor (BVP), and wherein the vector difference candidate list is a block vector difference (BVD) candidate list.

Clause 10A. The method of any of clauses 1A-9A, wherein the second distance is less than or equal to the second pel-interval.

Clause 11A. A device for decoding video data, the device comprising: one or more memories configured to store the video data; and processing circuitry coupled to the one or more memories, the processing circuitry being configured to: determine a vector predictor for a current block; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; determine a vector for the current block based on the vector predictor and a vector difference from the vector difference candidate list; and reconstruct the current block based on the vector for the current block.

Clause 12A. The device of clause 11A, wherein to determine the first set of vector difference candidates, the processing circuitry is configured to: add candidates to the first set of vector difference candidates that are each a set of positions surrounding a position of the vector predictor and an integer multiple of the first distance away from the vector predictor.

Clause 13A. The device of clause 12A, wherein to add candidates, the processing circuitry is configured to add candidates until a range threshold is satisfied.

Clause 14A. The device of any of clauses 12A and 13A, wherein to add candidates, the processing circuitry is configured to add candidates until a cost value associated with a candidate of the first set of vector difference candidates satisfies a cost threshold.

Clause 15A. The device of any of clauses 11A-14A, wherein to determine the second set of vector difference candidates, the processing circuitry is configured to: include at least a subset of candidates of the first set of vector difference candidates in the second set of vector difference candidates; and add candidates between the subset of candidates of the first set of vector difference candidates based on an integer multiple of the second distance.

Clause 16A. The device of clause 15A, wherein to add candidates between the subset of candidates, the processing circuitry is configured to add candidates to the second set of vector difference candidates until a cost value associated with a candidate of the second set of vector difference candidates satisfies a cost threshold.

Clause 17A. The device of any of clauses 11A-16A, wherein the processing circuitry is configured to: determine respective cost values associated with candidates of the first set of vector difference candidates; and construct a first subset of vector difference candidates based on the respective cost values, wherein to determine the second set of vector difference candidates, the processing circuitry is configured to determine the second set of vector difference candidates based on the first subset of vector difference candidates.

Clause 18A. The device of any of clauses 11A-17A, wherein the processing circuitry is configured to: determine respective cost values associated with candidates of the second set of vector difference candidates, wherein to construct the vector difference candidate list, the processing circuitry is configured to construct the vector difference candidate list based on the respective cost values.

Clause 19A. The device of any of clauses 11A-18A, wherein the current block is encoded in intra block-copy (IBC) merge mode with block vector differences (IBC-MBVD), wherein the vector predictor is a block vector predictor (BVP), and wherein the vector difference candidate list is a block vector difference (BVD) candidate list.

Clause 20A. The device of any of clauses 11A-19A, wherein the second distance is less than or equal to the second pel-interval.

Clause 21A. The device of any of clauses 11A-20A, wherein the device comprises one or more of a camera, a computer, a mobile device, a broadcast receiver device, or a set-top box.

Clause 22A. A computer-readable storage medium storing instructions thereon that when executed cause one or more processors to: determine a vector predictor for a current block of video data; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; determine a vector for the current block based on the vector predictor and a vector difference from the vector difference candidate list; and reconstruct the current block based on the vector for the current block.

Clause 23A. A device for encoding video data, the device comprising: one or more memories configured to store the video data; and processing circuitry coupled to the one or more memories, the processing circuitry being configured to: determine a vector predictor for a current block of the video data; determine a first set of vector difference candidates based on a first pel-interval, the first pel-interval defining a first distance between consecutive vector difference candidates in the first set of vector difference candidates starting with the vector predictor; determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval; construct a vector difference candidate list based on the second set of vector difference candidates; and signal an index into the vector difference candidate list for decoding the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining a vector predictor for a current block of the video data;
    determining a first set of vector difference candidates based on a first pel-interval, the first pel-interval defining a first distance between consecutive vector difference candidates in the first set of vector difference candidates starting with the vector predictor;
    determining a second set of vector difference candidates based on the first set of vector difference candidates and a second pel-interval, the second pel-interval defining a second distance between consecutive vector difference candidates in the second set of vector difference candidates, and the second pel-interval being less than the first pel-interval comprising:
        including at least a subset of candidates of the first set of vector difference candidates in the second set of vector difference candidates; and
        adding candidates between the subset of candidates of the first set of vector difference candidates based on an integer multiple of the second distance;
    constructing a vector difference candidate list based on the second set of vector difference candidates;
    determining a vector for the current block based on the vector predictor and a vector difference from the vector difference candidate list; and
    reconstructing the current block based on the vector for the current block.

2. The method of claim 1, wherein determining the first set of vector difference candidates comprises:
    adding candidates to the first set of vector difference candidates that are each a set of positions surrounding a position of the vector predictor and an integer multiple of the first distance away from the vector predictor.

3. The method of claim 2, wherein adding candidates comprises adding candidates until a range threshold is satisfied.

4. The method of claim 2, wherein adding candidates comprises adding candidates until a cost value associated with a candidate of the first set of vector difference candidates satisfies a cost threshold.

5. The method of claim 1, wherein adding candidates between the subset of candidates comprises adding candidates to the second set of vector difference candidates until a cost value associated with a candidate of the second set of vector difference candidates satisfies a cost threshold.

6. The method of claim 1, further comprising:
    determining respective cost values associated with candidates of the first set of vector difference candidates; and constructing a first subset of vector difference candidates based on the respective cost values,
wherein determining the second set of vector difference candidates comprises determining the second set of vector difference candidates based on the first subset of vector difference candidates.

7. The method of claim 1, further comprising:
determining respective cost values associated with candidates of the second set of vector difference candidates,
wherein constructing the vector difference candidate list comprises constructing the vector difference candidate list based on the respective cost values.

8. The method of claim 1, wherein the current block is encoded in intra block-copy (IBC) merge mode with block vector differences (IBC-MBVD), wherein the vector predictor is a block vector predictor (BVP), and wherein the vector difference candidate list is a block vector difference (BVD) candidate list.

9. The method of claim 1, wherein the second distance is less than or equal to the second pel-interval.

10. A device for decoding video data, the device comprising:
one or more memories configured to store the video data; and
processing circuitry coupled to the one or more memories, the processing circuitry being configured to:
determine a vector predictor for a current block;
determine a first set of vector difference candidates based on a first pel-interval, the first pel-interval defining a first distance between consecutive vector difference candidates in the first set of vector difference candidates starting with the vector predictor;
determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval, wherein to determine the second set of vector difference candidates, the processing circuitry is configured to:
include at least a subset of candidates of the first set of vector difference candidates in the second set of vector difference candidates; and
add candidates between the subset of candidates of the first set of vector difference candidates based on an integer multiple of the second distance;
construct a vector difference candidate list based on the second set of vector difference candidates;
determine a vector for the current block based on the vector predictor and a vector difference from the vector difference candidate list; and
reconstruct the current block based on the vector for the current block.

11. The device of claim 10, wherein to determine the first set of vector difference candidates, the processing circuitry is configured to:
add candidates to the first set of vector difference candidates that are each a set of positions surrounding a position of the vector predictor and an integer multiple of the first distance away from the vector predictor.

12. The device of claim 11, wherein to add candidates, the processing circuitry is configured to add candidates until a range threshold is satisfied.

13. The device of claim 11, wherein to add candidates, the processing circuitry is configured to add candidates until a cost value associated with a candidate of the first set of vector difference candidates satisfies a cost threshold.

14. The device of claim 10, wherein to add candidates between the subset of candidates, the processing circuitry is configured to add candidates to the second set of vector difference candidates until a cost value associated with a candidate of the second set of vector difference candidates satisfies a cost threshold.

15. The device of claim 10, wherein the processing circuitry is configured to:
determine respective cost values associated with candidates of the first set of vector difference candidates; and
construct a first subset of vector difference candidates based on the respective cost values,
wherein to determine the second set of vector difference candidates, the processing circuitry is configured to determine the second set of vector difference candidates based on the first subset of vector difference candidates.

16. The device of claim 10, wherein the processing circuitry is configured to:
determine respective cost values associated with candidates of the second set of vector difference candidates,
wherein to construct the vector difference candidate list, the processing circuitry is configured to construct the vector difference candidate list based on the respective cost values.

17. The device of claim 10, wherein the current block is encoded in intra block-copy (IBC) merge mode with block vector differences (IBC-MBVD), wherein the vector predictor is a block vector predictor (BVP), and wherein the vector difference candidate list is a block vector difference (BVD) candidate list.

18. The device of claim 10, wherein the second distance is less than or equal to the second pel-interval.

19. The device of claim 10, wherein the device comprises one or more of a camera, a computer, a mobile device, a broadcast receiver device, or a set-top box.

20. A device for encoding video data, the device comprising:
one or more memories configured to store the video data; and
processing circuitry coupled to the one or more memories, the processing circuitry being configured to:
determine a vector predictor for a current block of the video data;
determine a first set of vector difference candidates based on a first pel-interval, the first pel-interval defining a first distance between consecutive vector difference candidates in the first set of vector difference candidates starting with the vector predictor;
determine a second set of vector difference candidates based on the first set of vector difference candidates and a second pel-interval, the second pel-interval defining a second distance between consecutive vector difference candidates in the second set of vector difference candidates, and the second pel-interval being less than the first pel-interval, wherein to determine the second set of vector difference candidates, the processing circuitry is configured to:
include at least a subset of candidates of the first set of vector difference candidates in the second set of vector difference candidates; and
add candidates between the subset of candidates of the first set of vector difference candidates based on an integer multiple of the second distance;

construct a vector difference candidate list based on the second set of vector difference candidates; and signal an index into the vector difference candidate list for decoding the current block.

* * * * *